United States Patent
Huang et al.

(10) Patent No.: US 12,095,537 B2
(45) Date of Patent: Sep. 17, 2024

(54) SIGNAL TRANSMISSION METHOD AND APPARATUS, AND TERMINAL AND NETWORK SIDE DEVICE

(71) Applicant: DATANG MOBILE COMMUNICATIONS EQUIPMENT CO., LTD., Beijing (CN)

(72) Inventors: Qiuping Huang, Beijing (CN); Runhua Chen, Beijing (CN); Qiubin Gao, Beijing (CN); Xin Su, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 781 days.

(21) Appl. No.: 17/267,982

(22) PCT Filed: Aug. 14, 2019

(86) PCT No.: PCT/CN2019/100582
§ 371 (c)(1),
(2) Date: Feb. 11, 2021

(87) PCT Pub. No.: WO2020/034997
PCT Pub. Date: Feb. 20, 2020

(65) Prior Publication Data
US 2022/0052742 A1   Feb. 17, 2022

(30) Foreign Application Priority Data
Aug. 17, 2018   (CN) .................. 201810942011.X

(51) Int. Cl.
*H04B 7/06*   (2006.01)
*H04B 7/0404*   (2017.01)
(Continued)

(52) U.S. Cl.
CPC ......... *H04B 7/0695* (2013.01); *H04B 7/0404* (2013.01); *H04B 7/0417* (2013.01); *H04B 7/0452* (2013.01)

(58) Field of Classification Search
USPC ......................................... 370/329
See application file for complete search history.

(56) References Cited

U.S. PATENT DOCUMENTS

| 2008/0310324 A1 | 12/2008 | Chaponniere |
| 2010/0279621 A1 | 11/2010 | Brown et al. |

(Continued)

FOREIGN PATENT DOCUMENTS

| CN | 108111268 A | 6/2018 |
| CN | 108111272 A | 6/2018 |

(Continued)

OTHER PUBLICATIONS

Taiwanese Office Action dated Aug. 7, 2020 for Application No. 108129219.

(Continued)

*Primary Examiner* — Gregory B Sefcheck
*Assistant Examiner* — Majid Esmaeilian
(74) *Attorney, Agent, or Firm* — Harness, Dickey & Pierce, P.L.C.

(57) ABSTRACT

A signal transmission method, a device, a terminal, and a network device are provided. The method includes: receiving at least two sets of first indication information sent by a network device, wherein each set of first indication information is used to indicate at least one first signal resource; sending a first signal according to indication of the at least two sets of first indication information; wherein, the first signal includes multiple layers, each of the layers of the first signal has corresponding relationship with one set of first indication information.

16 Claims, 5 Drawing Sheets

(51) Int. Cl.
*H04B 7/0417* (2017.01)
*H04B 7/0452* (2017.01)

(56) References Cited

U.S. PATENT DOCUMENTS

| | | | |
|---|---|---|---|
| 2011/0206154 A1 | 8/2011 | Ding et al. | |
| 2014/0241242 A1 | 8/2014 | Josiam et al. | |
| 2015/0381246 A1* | 12/2015 | Huang | H04B 7/0617 |
| | | | 370/329 |
| 2016/0352403 A1 | 12/2016 | Kishiyama et al. | |
| 2018/0027540 A1 | 1/2018 | Guo et al. | |
| 2019/0173534 A1 | 6/2019 | Kakishima et al. | |
| 2019/0327717 A1 | 10/2019 | Li et al. | |
| 2020/0162133 A1* | 5/2020 | Harrison | H04W 52/248 |
| 2020/0169376 A1* | 5/2020 | Gao | H04L 5/10 |
| 2020/0177416 A1 | 6/2020 | Jiang et al. | |
| 2020/0196161 A1* | 6/2020 | Ahn | H04W 56/001 |
| 2020/0244334 A1* | 7/2020 | Huang | H04W 72/04 |
| 2020/0287602 A1* | 9/2020 | Park | H04W 72/23 |
| 2021/0044400 A1 | 2/2021 | Jiang et al. | |
| 2021/0144038 A1* | 5/2021 | Davydov | H04L 5/0023 |
| 2021/0306996 A1* | 9/2021 | Matsumura | H04W 72/20 |
| 2022/0052807 A1* | 2/2022 | Liu | H04L 5/0091 |

FOREIGN PATENT DOCUMENTS

| | | |
|---|---|---|
| CN | 108111283 A | 6/2018 |
| CN | 108282297 A | 7/2018 |
| EP | 3629510A1.7 | 1/2020 |
| JP | 2010-532940 A | 10/2010 |
| JP | 2012-523184 A | 9/2012 |
| JP | 2015-165640 A | 9/2015 |
| JP | 2016-514406 A | 5/2016 |
| JP | 2018-023100 A | 2/2018 |
| JP | 2019-531634 A | 10/2019 |
| WO | WO-2010/061724 A1 | 6/2010 |
| WO | WO-2018/031869 A1 | 2/2018 |
| WO | WO-2018/085709 A | 5/2018 |
| WO | WO-2018/126794 A1 | 7/2018 |
| WO | WO-2018/131945 A1 | 7/2018 |

OTHER PUBLICATIONS

Ericsson, "UL MIMO for non-codebook based transmission", Agenda Item 7.2.1.3, 3GPP TSG RAN WG1 Meeting 90bis, R1-1718426, Prague, CZ, Oct. 9-13, 2017.
3GPP TR 38.912, V15.0.0 (Jun. 2018), 3rd Generation Partnership Project; Technical Specification Group Radio Access Network; Study on New Radio (NR) access technology (Release 15).
Written Opinion and International Search Report for International Application No. PCT/CN2019100582 dated Feb. 22, 2021.
Extended European Search Report dated Sep. 3, 2021 for Application No. EP 19 84 9495.7.
Huawei, Hisilicon, "Discussion on panel-based UL beam selection", Agenda Item 7.2.8, 3GPP TSG RAN WG1 Meeting #94, R1-1809122, Aug. 20-24, 2018, Gothenburg, Sweden.
Japanese Office Action date of drafting Mar. 28, 2022 for JP Patent Application No. 2021-507955.
Japanese Office Action for Japanese Patent Application No. 2021-507955 dated Nov. 8, 2022.

* cited by examiner

SIGNAL TRANSMISSION METHOD AND APPARATUS, AND TERMINAL AND NETWORK SIDE DEVICE

CROSS-REFERENCE TO RELATED APPLICATIONS

This application is a U.S. national phase application of PCT Application No. PCT/CN2019/100582 filed on Aug. 14, 2019, which claims a priority to the Chinese patent application No. 201810942011.X filed in China on Aug. 17, 2018, a disclosure of which is incorporated herein by reference in its entirety.

TECHNICAL FIELD

The present disclosure relates to the field of communications technologies, and in particular, relates to a signal transmission method, a signal transmission device, a terminal, and a network device.

BACKGROUND

In view of an important role of a Multiple-Input Multiple-Output (MIMO) technology in improving a peak rate and system spectrum utilization, Long Term Evolution (LTE)/LTE-Advanced (LTE-A) and other wireless access technology standards are built on the basis of a MIMO+Orthogonal Frequency Division Multiplexing (OFDM) technology. A performance gain of the MIMO technology comes from a spatial freedom degree that a multi-antenna system may acquire. Therefore, one of the most important evolution directions of the MIMO technology in a standardization development process is expansion of dimensions.

In LTE Rel-8, up to 4 layers of MIMO transmission may be supported. Enhancement of a Multi-User MIMO (MU-MIMO) technology is focused in Rel-0. MU-MIMO transmission in Transmission Mode (TM)-8 may support up to 4 downlink layers. Supporting 8 antenna ports is introduced in Rel-10, which further improves a spatial resolution of channel state information, and further expands Single-User MIMO (SU-MIMO) transmission capacity to up to 9 layers. An improvement that a Full Dimension-MIMO (FD-MIMO) technology supports 32 ports is introduced in Rel-13 and Rel-14, to achieve full-dimensional and vertical beamforming.

In order to further improve the MIMO technology, a massive antenna technology is introduced into a mobile communication system. A fully digital massive antenna for a base station may have up to 128/256/512 antenna elements, and up to 128/256/512 transceiver units, and each antenna element is connected to one transceiver unit. By sending pilot signals of up to 128/256/512 antenna ports, the terminal may measure and feed back channel state information. An antenna array with up to 32/64 antenna elements for a terminal may also be configured. Through beamforming on both of a base station side and a terminal side, a huge beamforming gain is acquired to compensate for signal attenuation caused by a path loss. Especially for communication in a high frequency band, such as a frequency of 30 GHz, path loss makes a coverage range of radio signals be extremely limited. Through the massive antenna technology, the coverage range of radio signals may be expanded to a practical coverage.

Each antenna element for a fully digital antenna array has an independent transceiver unit, which will greatly increase a size, a cost and a power consumption of the device. Especially for a Analog-to-Digital Converter (ADC) and a Digital-to-Analog Converter (DAC) of the transceiver unit, power consumption thereof has only been reduced by about $\frac{1}{10}$ in the past ten years, and performance improvement is also relatively limited. In order to reduce the size, the cost, and the power consumption of the device, a technical solution based on analog beamforming is proposed. As shown in FIG. 1 and FIG. 2, a transmitter end has $N_t$ transceiver units and a receiver end has $N_r$ transceiver units. A main characteristic of the analog beamforming is that an intermediate frequency (FIG. 1) or a radio frequency signal (FIG. 2) is weighted and beamformed by a phase shifter. Advantage thereof is that all transmitting (receiving) antennas have only one transceiver unit, which is simple to implement and reduces the cost, the size and the power consumption.

In order to further improve performance of analog beamforming, a digital-analog hybrid beamforming transceiver architecture scheme is proposed, as shown in FIG. 3. In FIG. 3, a transmitter end and a receiver end respectively have transceiver units of $N_{RF}^T$ and $N_{RF}^R$, the number of antenna elements at the transmitter end is $N^T > N_{RF}^T$, and the number of antenna elements at the receiver end is $N^R > N_{RF}^R$; the maximum number of parallel transmission streams supported by beamforming is formula $\min(N_{RF}^T, N_{RF}^R)$. A hybrid beamforming structure in FIG. 3 achieves a tradeoff between flexibility of digital beamforming and low complexity of analog beamforming, and has an ability to support multiple data streams and multiple users, and at the same time, complexity is also controlled to be within a reasonable range.

It should be noted that, in FIG. 1, FIG. 2 and FIG. 3, PA means a power amplifier; LNA means a low noise amplifier.

Both analog beamforming and digital-analog hybrid beamforming need to adjust analog beamforming weights at the receiver end and at the transmitter end, so that a formed beam may be aimed at a correspondent. For downlink transmission, a beamforming weight transmitted at the base station side and a beamforming weight received at the terminal side need to be adjusted, while for uplink transmission, a beamforming weight transmitted at the terminal side and a beamforming weight received at the base station side need to be adjusted. A beamforming weight is usually acquired by sending a training signal. In a downlink direction, the base station sends a downlink beam training signal, the terminal measures the downlink beam training signal, selects an optimal beam sent by the base station, and feeds back information related to the beam to the base station, and selects the corresponding optimal receiving beam and saves it locally.

A terminal equipped with multiple transmitting antennas may perform uplink beamforming. In order to determine an uplink (UL) beamforming matrix, a terminal in a RRC (Radio Resource Control) connected state (RRC_CONNECTED) state may be semi-statically configured with multiple terminal-specific uplink Sounding Reference Signal (SRS) resources. An SRS signal transmitted on each SRS resource uses a specific beamforming matrix for beamforming. The terminal transmits these SRS resources in uplink. A transmission and reception point (TRP) measures signal qualities of different SRS resources, and selects a preferred SRS resource. The TRP sends an index of the selected SRS resource (for example, an Sounding Reference Signal resource indicator (SRI), that is, an SRS resource indicator) to the terminal via Downlink Control Information (DCI). The terminal may infer, from the SRI, which uplink beamforming matrix (for example, a SRS resource) is recommended by the TRP for future uplink transmission. The terminal may then use the uplink beamforming matrix indicated by the SRI for future uplink transmission.

The terminal may have multiple antenna panels (panel, or antenna panel) for uplink transmission, and each antenna panel is composed of a group of antenna elements. The exact number of antenna panels. The number of antenna elements and arrangement of the antenna elements in each panel are implementation issues, and different terminals may have different implementation manners. The terminal may send one layer from one panel at a time, and the terminal may also transmit one layer from a subset of antenna panels (including more than one antenna panel) at the same time. The description here also applies to SRS resources (transmission of SRS signals).

A terminal with a single antenna panel may be configured with an SRS resource set for scanning of transmission beams. Each SRS resource set includes multiple SRS resources, and different SRS resources use different beams for beamforming. Since one antenna panel may only form one analog beam at a time, different SRS resources (using different beams) in an SRS resource set are sent at different time instants. A base station gNB receives an SRS resource set, and determines a preferred transmission beam (for example, the transmission beam used by the SRS resource with an optimal received quality) based on the received SRS resource set, and indicates it to the terminal. Subsequently, the base station may configure a second SRS resource set for the terminal for Channel State Information (CSI) acquisition. The SRS resource set for CIS acquisition may include multiple SRS resources, and each SRS resource uses the same or different analog beams for beamforming (the analog beams here may be acquired through the foregoing beam-scanning procedure). The base station receives an SRS corresponding to the second SRS resource set. After completing channel estimation, the base station schedules a Physical Uplink Shared Channel (PUSCH), and an SRI indicator pointing to a SRS resource in the second SRS resource set (the SRS resource set for CSI acquisition) is included in a PUSCH scheduling grant. The terminal uses an analog beam for transmitting an SRS indicated by the SRI as a transmission beam of the PUSCH.

It is not supported in the related art that the base station flexibly schedules the terminal according to the number of antenna panels of the terminal so that the multi-antenna panel joint transmission for PUSCH is performed on multiple antenna panels simultaneously.

SUMMARY

The objective of the present disclosure is to provide a signal transmission method, a signal transmission device, a terminal and a network device to solve a problem that indicating multiple sets of uplink scheduling information for the terminal by the network device in the related art is not supported, thereby limiting flexibility of uplink transmission. In addition, the present disclosure may enable the terminal to use multiple antenna panels to transmit multiple layers of an uplink signal, which may improve performance of uplink transmission.

To address the above problems, a signal transmission method performed by a terminal is provided. The method includes receiving at least two sets of first indication information sent by a network device, wherein each set of first indication information is used to indicate at least one first signal resource; sending a first signal according to indication of the at least two sets of first indication information, wherein, the first signal includes multiple layers, each of the layers of the first signal has corresponding relationship with one of the at least two sets of first indication information.

Prior to receiving the at least two sets of first indication information sent by the network device, the method further includes: receiving first configuration information sent by the network device, wherein the first configuration information is configured to configure at least one first signal resource for the terminal; sending a second signal to the network device according to the first configuration information, wherein the at least one first signal resource indicated by each set of first indication information is a first signal resource in the at least one first signal resource configured by the first configuration information.

Sending the first signal according to the indication of the at least two sets of first indication information includes: sending the first signal by using an antenna panel used when sending a second signal corresponding to the at least one first signal resource indicated by each set of first indication information.

In a case that only one first signal resource including multiple antenna ports is configured by the first configuration information, prior to sending the first signal according to the indication of the at least two sets of first indication information, the method further includes: receiving first grouping information sent by the network device, wherein the first grouping information is configured to indicate grouping of antenna ports of the at least one first signal resource configured by the first configuration information; wherein, each set of first indication information corresponds to an antenna port group, and each set of first indication information in the at least two sets of first indication information is configured to indicate at least one antenna port from a corresponding antenna port group.

In a case that multiple first signal resources are configured by the first configuration information, prior to sending the first signal according to the indication of the at least two sets of first indication information, the method further includes: receiving second grouping information sent by the network device, wherein the second grouping information is configured to indicate grouping of the first signal resources configured by the first configuration information; wherein, each set of first indication information corresponds to a first signal resource group, and each set of first indication information in the at least two sets of first indication information is configured to indicate at least one first signal resource from a corresponding first signal resource group.

Different sets of first indication information are coded independently; or, the at least two sets of first indication information are coded jointly.

Different sets of first indication information are indicated via different physical layer signaling; or, the at least two sets of first indication information are indicated via a same physical layer signaling.

The first configuration information configures at least one first signal resource subgroup, and each of the at least one first signal resource subgroup includes at least one first signal resource; wherein, each set of first indication information corresponds to a first signal resource subgroup.

The method further includes: receiving second indication information of first signal resource subgroups corresponding to the at least two sets of first indication information sent by the network device; determining, according to the second indication information, first signal resource subgroups corresponding to the at least two sets of first indication information.

In a case that only one first signal resource subgroup is configured by the first configuration information and the first signal resource subgroup includes at least one first signal resource, each set of first indication information is configured to indicate at least one first signal resource selected by the network device from the first signal resource subgroup; in a case that the first configuration information configures multiple first signal resource subgroups for the terminal and each first signal resource subgroup includes a first signal resource, each set of first indication information is used to indicate at least one first signal resource subgroup selected by the network device from the multiple first signal resource subgroups.

Each set of first indication information indicates at least one first signal resource by at least one of following: indicating a local index of the at least one first signal resource in the first signal resource subgroup where the at least one first signal resource is located; indicating a global index of the at least one first signal resource in all first signal resources configured by the network device; indicating an absolute index of the at least one first signal resource in all first signal resources configured by the network device; indicating a local index of the first signal resource subgroup, where the at least one first signal resource is located, in first signal resource subgroups corresponding to an antenna panel corresponding to the first signal resource subgroup; indicating a global index of the first signal resource subgroup, where the at least one first signal resource is located, in all first signal resource subgroups configured by the network device; indicating an absolute index of the first signal resource subgroup, where the at least one first signal resource is located, in all first signal resource subgroups configured by the network device.

Prior to sending the first signal according to the indication of the at least two sets of first indication information, the method further includes: acquiring the corresponding relationship between each of the layers of the first signal and each set of first indication information.

Acquiring the corresponding relationship between each of the layers of the first signal and each set of first indication information includes: receiving information about the corresponding relationship between each of the layers of the first signal and each set of first indication information sent by the network device; acquiring, according to the information about the corresponding relationship, the corresponding relationship between each of the layers of the first signal and each set of first indication information.

The information about the corresponding relationship is indicated by at least one of following: indicating, by an information field with a length of K bits, layers corresponding to each set of first indication information in a bitmap; wherein K is an integer greater than or equal to 2; indicating the number of layers corresponding to each set of first indication information; indicating a maximum layer identity of a layer corresponding to each set of first indication information.

Prior to sending the second signal to the network device according to the first configuration information, the method further includes: receiving beam indication information sent by the network device, wherein the beam indication information is configured to indicate a transmission beam corresponding to the first signal resource included in the first configuration information; sending the second signal to the network device according to the first configuration information includes: sending, according to the first configuration information, the second signal to the network device by using the transmission beam indicated by the beam indication information.

Prior to receiving the beam indication information sent by the network device, the method further includes: receiving third indication information sent by the network device, wherein the third indication information is configured to instruct the terminal to send third signals; the third signals are multiple sets of uplink reference signal resources used for beam training, and each set of uplink reference signal resources includes at least one uplink reference signal resource; sending, according to the third indication information, the third signals by using multiple antenna panels of the terminal, respectively.

Optionally, each set of first indication information corresponds to an antenna panel of the terminal.

A signal transmission method performed by a network device is further provided. The method includes sending at least two sets of first indication information to a terminal, wherein each set of first indication information is used to indicate at least one first signal resource; receiving a first signal sent by the terminal based on indication of the at least two sets of first indication information; wherein, the first signal includes multiple layers, each of the layers of the first signal has corresponding relationship with one set of first indication information.

Prior to sending the at least two sets of first indication information to the terminal, the method further includes: sending first configuration information to the terminal, wherein the first configuration information is used to configure at least one first signal resource for the terminal; receiving a second signal sent based on the first configuration information by the terminal; measuring the second signal, selecting at least one first signal resource from first signal resources corresponding to the second signal; wherein the at least one first signal resource indicated by each set of first indication information is at least one first signal resource selected by the network device.

Receiving the first signal sent by the terminal based on the indication of the at least two sets of first indication information includes: receiving the first signal sent by the terminal by using an antenna panel used when the terminal sends the second signal corresponding to the at least one first signal resource indicated by each set of first indication information, respectively.

In a case that only one first signal resource including multiple antenna ports is configured by the first configuration information, prior to receiving the second signal sent based on the first configuration information by the terminal, the method further includes: sending first grouping information to the terminal, wherein the first grouping information is configured to indicate grouping of antenna ports of the first signal resource configured by the first configuration information; wherein, each set of first indication information corresponds to an antenna port group, and each set of first indication information in the at least two sets of first indication information is configured to indicate at least one antenna port from a corresponding antenna port group.

In a case that multiple first signal resources are configured by the first configuration information, prior to receiving the second signal sent based on the first configuration information by the terminal, the method further includes: sending second grouping information to the terminal, wherein the second grouping information is configured to indicate grouping of the first signal resources configured by the first configuration information; wherein, each set of first indication information corresponds to a first signal resource group, and each set of first indication information in the at least two sets of first indication information is configured to indicate at least one first signal resource from a corresponding first signal resource group.

Different sets of first indication information are coded independently; or, the at least two sets of first indication information are coded jointly.

Different sets of first indication information are indicated via different physical layer signalings; or, the at least two sets of first indication information are indicated via a same physical layer signaling.

The first configuration information configures at least one first signal resource subgroup, and each first signal resource subgroup includes at least one first signal resource; each set of first indication information corresponds to a first signal resource subgroup.

The method further includes: sending second indication information of first signal resource subgroups corresponding to the at least two sets of first indication information to the terminal; determining, according to the second indication information, the first signal resource subgroups corresponding to the at least two sets of first indication information.

In a case that only one first signal resource subgroup is configured by the first configuration information and the first signal resource subgroup includes at least one first signal resource, each set of first indication information is configured to indicate at least one first signal resource selected by the network device from the first signal resource subgroup; in a case that the first configuration information configures multiple first signal resource subgroups for the terminal and each first signal resource subgroup includes a first signal resource, each set of first indication information is configured to indicate at least one first signal resource subgroup selected by the network device from the multiple first signal resource subgroups.

Each set of first indication information indicates at least one first signal resource by at least one of following: indicating a local index of the at least one first signal resource in the first signal resource subgroup where the at least one first signal resource is located; indicating a global index of the at least one first signal resource in all first signal resources configured by the network device; indicating an absolute index of the at least one first signal resource in all first signal resources configured by the network device; indicating a local index of the first signal resource subgroup, where the at least one first signal resource is located, in first signal resource subgroups corresponding to an antenna panel corresponding to the first signal resource subgroup; indicating a global index of the first signal resource subgroup, where the at least one first signal resource is located, in all first signal resource subgroups configured by the network device; indicating an absolute index of the first signal resource subgroup, where the at least one first signal resource is located, in all first signal resource subgroups configured by the network device.

Prior to receiving the first signal sent by the terminal based on the indication of the at least two sets of first indication information, the method further includes: sending to the terminal information about corresponding relationship between each of the layers of the first signal and each set of first indication information, so that the terminal acquires, according to the information about the corresponding relationship, the corresponding relationship between each of the layers of the first signal and each set of first indication information.

The information about the corresponding relationship is indicated by at least one of following: indicating, by an information field with a length of K bits, layers corresponding to each set of first indication information in a bitmap; wherein K is an integer greater than or equal to 2; indicating the number of layers corresponding to each set of first indication information; indicating a maximum layer identity of a layer corresponding to each set of first indication information.

Prior to receiving the second signal sent based on the first configuration information by the terminal, the method further includes: sending beam indication information to the terminal, wherein the beam indication information is configured to indicate a transmission beam corresponding to the first signal resource included in the first configuration information; receiving the second signal sent based on the first configuration information by the terminal includes: receiving the second signal sent by the terminal, based on the first configuration information, to the network device by using the transmission beam indicated by the beam indication information.

Prior to sending the beam indication information to the terminal, the method further includes: sending third indication information to the terminal, wherein the third indication information is configured to instruct the terminal to send third signals; the third signals are multiple sets of uplink reference signal resources used for beam training, and each set of uplink reference signal resources includes at least one uplink reference signal resource; receiving the third signals sent by the terminal according to the third indication information by using multiple antenna panels of the terminal; selecting at least one uplink reference signal resource from the uplink reference signal resources corresponding to the third signal; wherein the transmission beam indicated by the beam indication information is a transmission beam corresponding to at least one uplink reference signal resource selected by the network device.

Optionally, each set of first indication information corresponds to an antenna panel of the terminal.

A signal transmission device applied to a terminal is further provided. The signal transmission device includes: a first reception module, configured to receive at least two sets of first indication information sent by a network device, wherein each set of first indication information is configured to indicate at least one first signal resource; a first sending module, configured to send a first signal according to indication of the at least two sets of first indication information, wherein, the first signal includes multiple layers, each of the layers of the first signal has corresponding relationship with one set of first indication information.

A terminal is further provided. The terminal includes: multiple antenna panels, wherein the terminal further includes: a transceiver, a storage, a processor, and a program stored in the storage and executable by the processor; wherein the processor is configured to read the program in the storage and control the transceiver to execute the following steps: receiving at least two sets of first indication information sent by a network device, wherein each set of first indication information is configured to indicate at least one first signal resource; sending a first signal according to indication of the at least two sets of first indication information, wherein, the first signal includes multiple layers, each of the layers of the first signal has corresponding relationship with one set of first indication information.

The transceiver is further configured to: receive first configuration information sent by the network device, wherein the first configuration information is used to configure at least one first signal resource for the terminal; send a second signal to the network device according to the first configuration information; wherein the at least one first signal resource indicated by each set of first indication information is a first signal resource in the at least one first signal resource configured by the first configuration information.

The transceiver is further configured to: send the first signal by using an antenna panel used when sending the second signal corresponding to the at least one first signal resource indicated by each set of first indication information.

In a case that only one first signal resource including multiple antenna ports is configured by the first configuration information, the transceiver is further configured to: receive first grouping information sent by the network device, wherein the first grouping information is configured to indicate grouping of antenna ports of the at least one first signal resource configured by the first configuration information; each set of first indication information corresponds to an antenna port group, and each set of first indication information in the at least two sets of first indication information is configured to indicate at least one antenna port from a corresponding antenna port group.

In a case that multiple first signal resources are configured by the first configuration information, the transceiver is further configured to: receive second grouping information sent by the network device, wherein the second grouping information is configured to indicate grouping of the first signal resources configured by the first configuration information; wherein, each set of first indication information corresponds to a first signal resource group, and each set of first indication information in the at least two sets of first indication information is configured to indicate at least one first signal resource from a corresponding first signal resource group.

Different sets of first indication information are coded independently; or, the at least two sets of first indication information are coded jointly.

Different sets of first indication information are indicated via different physical layer signalings; or, the at least two sets of first indication information are indicated via a same physical layer signaling.

The first configuration information configures at least one first signal resource subgroup, and each first signal resource subgroup includes at least one first signal resource; each set of first indication information corresponds to a first signal resource subgroup.

The transceiver is further configured to: receive second indication information of first signal resource subgroups corresponding to the at least two sets of first indication information sent by the network device; determine, according to the second indication information, the first signal resource subgroups corresponding to the at least two sets of first indication information.

in a case that only one first signal resource subgroup is configured by the first configuration information and the first signal resource subgroup includes at least one first signal resource, each set of first indication information is configured to indicate at least one first signal resource selected by the network device from the first signal resource subgroup; or in a case that the first configuration information configures multiple first signal resource subgroups for the terminal and each first signal resource subgroup includes a first signal resource, each set of first indication information is configured to indicate at least one first signal resource subgroup selected by the network device from the multiple first signal resource subgroups.

Each set of first indication information indicates at least one first signal resource by at least one of following: indicating a local index of the at least one first signal resource in the first signal resource subgroup where the at least one first signal resource is located; indicating a global index of the at least one first signal resource in all first signal resources configured by the network device; indicating an absolute index of the at least one first signal resource in all first signal resources configured by the network device; indicating a local index of the first signal resource subgroup, where the at least one first signal resource is located, in first signal resource subgroups corresponding to an antenna panel corresponding to the first signal resource subgroup; indicating a global index of the first signal resource subgroup, where the at least one first signal resource is located, in all first signal resource subgroups configured by the network device; indicating an absolute index of the first signal resource subgroup, where the at least one first signal resource is located, in all first signal resource subgroups configured by the network device.

The transceiver is further configured to: acquire the corresponding relationship between each of the layers of the first signal and each set of first indication information.

The transceiver is further configured to: receive information about the corresponding relationship between each of the layers of the first signal and each set of first indication information sent by the network device; the processor is further configured to: acquire, according to the information about the corresponding relationship, the corresponding relationship between each of the layers of the first signal and each set of first indication information.

The information about the corresponding relationship is indicated by at least one of following: indicating, by an information field with a length of K bits, layers corresponding to each set of first indication information in a bitmap; wherein K is an integer greater than or equal to 2; indicating the number of layers corresponding to each set of first indication information; indicating a maximum layer identity of a layer corresponding to each set of first indication information.

The transceiver is further configured to: receive beam indication information sent by the network device, wherein the beam indication information is configured to indicate a transmission beam corresponding to the at least one first signal resource included in the first configuration information; send, according to the first configuration information, the second signal to the network device by using the transmission beam indicated by the beam indication information.

The transceiver is further configured to: receive third indication information sent by the network device, wherein the third indication information is configured to instruct the terminal to send third signals; the third signals are multiple sets of uplink reference signal resources used for beam training, and each set of uplink reference signal resources includes at least one uplink reference signal resource; send, according to the third indication information, the third signals by using multiple antenna panels of the terminal, respectively.

Optionally, each set of first indication information corresponds to an antenna panel of the terminal.

A computer readable storage medium is further provided. The computer readable storage medium stores thereon a computer program, wherein when the computer program is executed by a processor, steps of the above signal transmission method are implemented.

A signal transmission device applied to a network device is provided. The signal transmission device includes: a second sending module, configured to send at least two sets of first indication information to a terminal, wherein each set of first indication information is configured to indicate at least one first signal resource; a second reception module, configured to receive a first signal sent by the terminal based on indication of the at least two sets of first indication information, wherein, the first signal includes multiple layers, each of the layers of the first signal has corresponding relationship with one set of first indication information, respectively.

A network device is further provided. The network device includes: a transceiver, a storage, a processor and a computer program stored on the storage and executable by the processor, wherein, the processor is configured to read the program on the storage and control the transceiver to execute the following steps: sending at least two sets of first indication information to a terminal, wherein each set of first indication information is used to indicate at least one first signal resource; receiving a first signal sent by the terminal based on indication of the at least two sets of first indication information; wherein, the first signal includes multiple layers, each of the layers of the first signal has corresponding relationship with one set of first indication information.

The transceiver is further configured to: send first configuration information to the terminal, wherein the first configuration information is configured to configure at least one first signal resource for the terminal; receive a second signal sent based on the first configuration information by the terminal; measure the second signal, select at least one first signal resource from first signal resources corresponding to the second signal, wherein the at least one first signal resource indicated by each set of first indication information is the at least one first signal resource selected by the network device.

The transceiver is further configured to: receive the first signal sent by the terminal by using an antenna panel used when the terminal sends the second signal corresponding to the at least one first signal resource indicated by each set of first indication information, respectively.

In a case that only one first signal resource including multiple antenna ports is configured by the first configuration information, the transceiver is further configured to: send first grouping information to the terminal, wherein the first grouping information is used to indicate grouping of antenna ports of the first signal resource configured by the first configuration information; wherein, each set of first indication information corresponds to an antenna port group, and each set of first indication information in the at least two sets of first indication information is configured to indicate at least one antenna port from a corresponding antenna port group.

In a case that multiple first signal resources are configured by the first configuration information, the transceiver is further configured to: send second grouping information to the terminal, wherein the second grouping information is configured to indicate grouping of the first signal resources configured by the first configuration information; wherein, each set of first indication information corresponds to a first signal resource group, and each set of first indication information in the at least two sets of first indication information is configured to indicate at least one first signal resource from a corresponding first signal resource group.

Different sets of first indication information are coded independently; or, the at least two sets of first indication information are coded jointly.

Different sets of first indication information are indicated via different physical layer signalings; or, the at least two sets of first indication information are indicated via a same physical layer signaling.

The first configuration information configures at least one first signal resource subgroup, and each first signal resource subgroup includes at least one first signal resource; each set of first indication information corresponds to a first signal resource subgroup.

The transceiver is further configured to: send second indication information of a first signal resource subgroup corresponding to the at least two sets of first indication information to the terminal; determine, according to the second indication information, the first signal resource subgroups corresponding to the at least two sets of first indication information.

In a case that only one first signal resource subgroup is configured by the first configuration information and the first signal resource subgroup includes at least one first signal resource, each set of first indication information is configured to indicate at least one first signal resource selected by the network device from the first signal resource subgroup; or in a case that the first configuration information configures multiple first signal resource subgroups for the terminal and each first signal resource subgroup includes one first signal resource, each set of first indication information is configured to indicate at least one first signal resource subgroup selected by the network device from the multiple first signal resource subgroups.

Each set of first indication information indicates at least one first signal resource by at least one of following: indicating a local index of the at least one first signal resource in the first signal resource subgroup where the at least one first signal resource is located; indicating a global index of the at least one first signal resource in all first signal resources configured by the network device; indicating an absolute index of the at least one first signal resource in all first signal resources configured by the network device; indicating a local index of the first signal resource subgroup, where the at least one first signal resource is located, in first signal resource subgroups corresponding to an antenna panel corresponding to the first signal resource subgroup; indicating a global index of the first signal resource subgroup, where the at least one first signal resource is located, in all first signal resource subgroups configured by the network device; indicating an absolute index of the first signal resource subgroup, where the at least one first signal resource is located, in all first signal resource subgroups configured by the network device.

The transceiver is further configured to: send to the terminal information about corresponding relationship between each of the layers of the first signal and each set of first indication information, so that the terminal acquires, according to the information about the corresponding relationship, the corresponding relationship between each of the layers of the first signal and each set of first indication information.

The information about the corresponding relationship is indicated by at least one of following: indicating, by an information field with a length of K bits, layers corresponding to each set of first indication information in a bitmap; wherein K is an integer greater than or equal to 2; indicating the number of layers corresponding to each set of first indication information; indicating a maximum layer identity of a layer corresponding to each set of first indication information.

The transceiver is further configured to: send beam indication information to the terminal, wherein the beam indication information is configured to indicate a transmission beam corresponding to the at least one first signal resource included in the first configuration information; receive the second signal sent, based on the first configuration information, by the terminal to the network device by using the transmission beam indicated by the beam indication information.

The transceiver is further configured to: send third indication information to the terminal, wherein the third indication information is configured to instruct the terminal to send third signals; the third signals are multiple sets of uplink reference signal resources used for beam training, and each set of uplink reference signal resources includes at least one uplink reference signal resource; receive the third signals sent according to the third indication information by the terminal by using multiple antenna panels of the terminal. The processor is further configured to: select at least one uplink reference signal resource from the uplink reference signal resources corresponding to the third signals; wherein the transmission beam indicated by the beam indication information is: a transmission beam corresponding to at least one uplink reference signal resource selected by the network device.

Optionally, each set of first indication information corresponds to an antenna panel of the terminal.

A computer readable storage medium is further provided. The compute readable storage medium stores thereon a computer program, wherein when the computer program is executed by a processor, steps of the above signal transmission method are implemented.

The above technical solutions of the present disclosure have at least the following beneficial effects.

In a signal transmission method, a device, a terminal and a network device of the embodiments of the present disclosure, a first signal including multiple layers is sent based on at least two sets of first indication information sent by the network device, each of the layers of the first signal has corresponding relationship with a set of first indication information, and each set of first indication information corresponds to an antenna panel, so that multi-antenna panel joint transmission of multiple layers is performed on multiple antenna panels in parallel; and each antenna panel corresponds to a set of first indication information, so that the network device selects an independent beamforming beam for each antenna panel (the beamforming beam is indicated by the first signal resource), so as to obtain a better beamforming gain and improve performance of uplink transmission.

DETAILED DESCRIPTION

Figure 1:
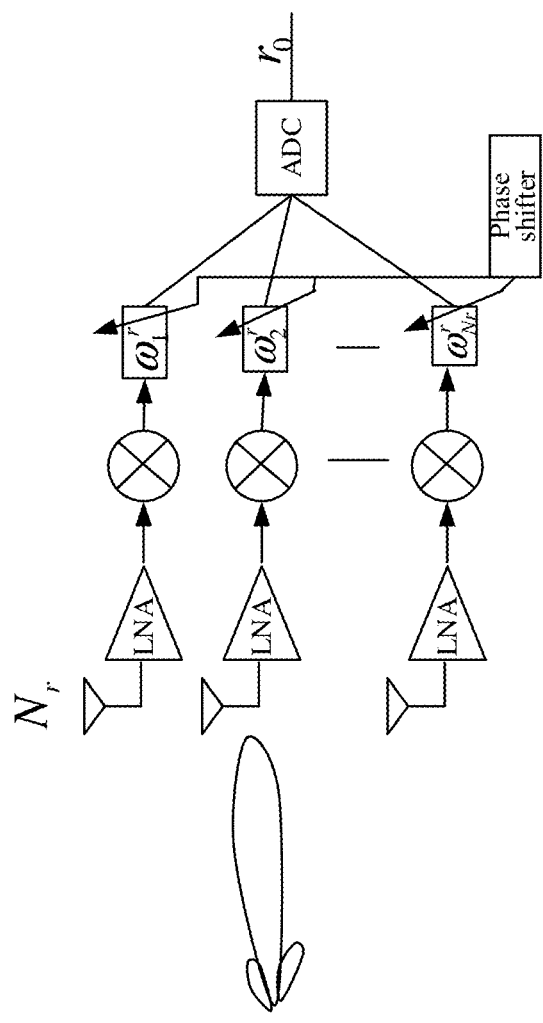
FIG. 1 is a schematic diagram of a principle of weighted beamforming to an intermediate frequency signal in analog beamforming.
Figure 1:
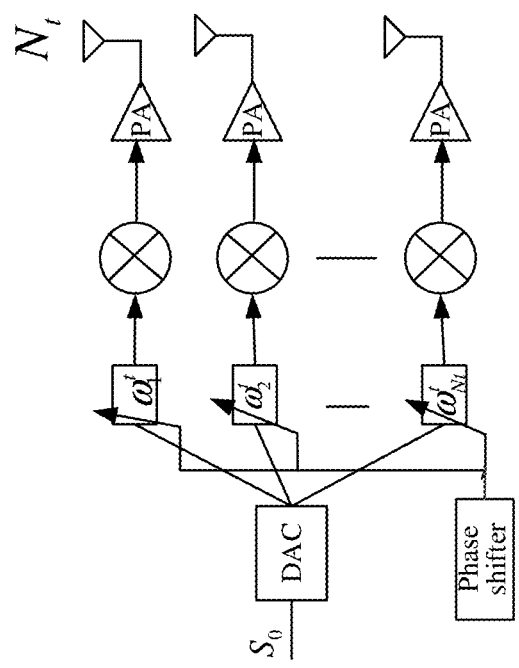
Figure 2:
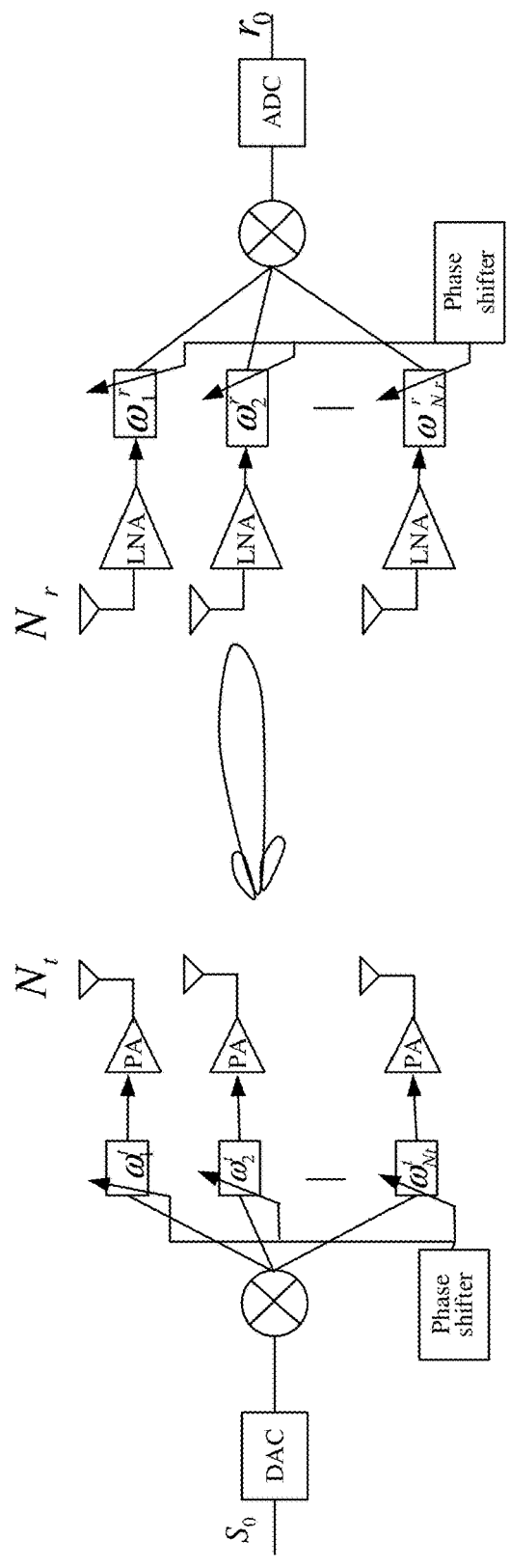
FIG. 2 is a schematic diagram of a principle of weighted beamforming to a radio frequency signal in analog beamforming.
Figure 3:
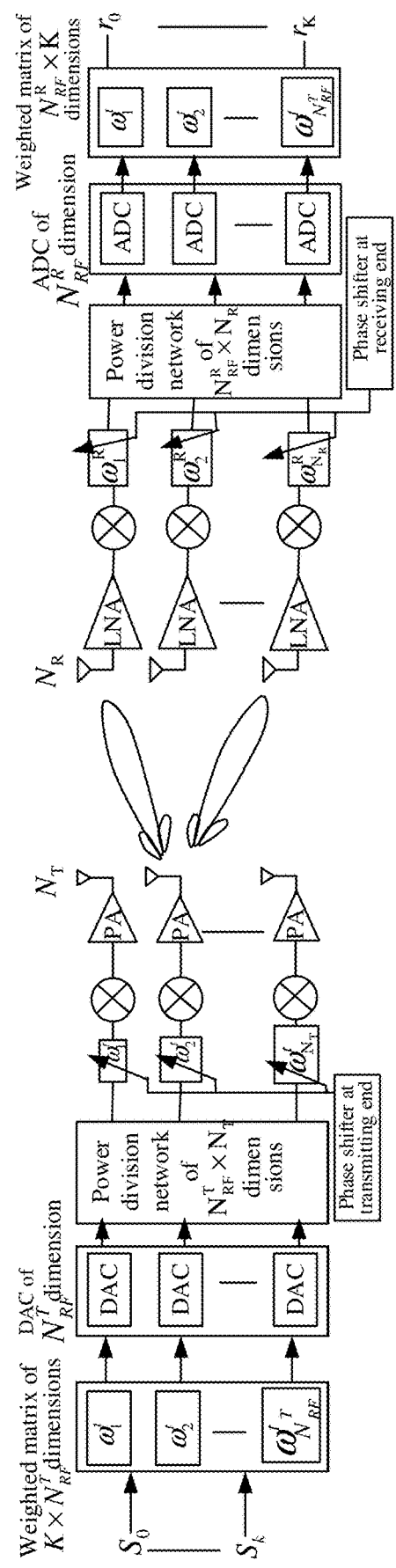
FIG. 3 is a schematic diagram of a principle of digital-analog hybrid beamforming.

In order to make technical problems to be solved, technical solutions and advantages of the present disclosure more apparent, the present disclosure will be clearly and completely described in detail below with reference to drawings and specific embodiments.

The technical solutions of embodiments of the present disclosure will be clearly and completely described below with reference to the drawings of embodiments of the present disclosure. Apparently, the described embodiments are some embodiments of the present disclosure, but are not all the embodiments. Based on embodiments of the present disclosure, all other embodiments derived by a person of ordinary skills in the art without any creative effort shall fall within the protection scope of the present disclosure.

In embodiments of the present disclosure, terms such as "exemplary" or "for example" are used to represent examples, illustrations, or explanations. In embodiments of the present disclosure, any embodiment or design solution described as "exemplary" or "for example" should not be construed as being more preferable or advantageous than other embodiments or design solutions. Rather, use of terms such as "illustrative" or "for example" is intended to present concepts in a concrete manner.

Embodiments of the present disclosure will be described below with reference to the drawings. A method of detecting an advance indication signal, a transmission method, a terminal, and a network device provided in embodiments of the present disclosure may be applied in a radio communication system. The radio communication system may be a 5G system, or an Evolved Long Term Evolution (eLTE) system, or a subsequent evolved communication system. In practical implementations, connection between the above-mentioned various devices may be wireless connection or wired connection.

It should be noted that, the above-mentioned communication system may include multiple terminals, and the network device may communicate with multiple terminals (for transmitting signaling or data).

The network device provided in an embodiment of the present disclosure may be a base station, which may be a commonly used base station, an evolved node base station (eNB), or a network device in a 5G system (e.g., a next generation node base station (gNB) or a transmission and reception point (TRP)) or a cell.

The terminal provided in an embodiment of the present disclosure may be a mobile phone, a tablet computer, a notebook computer, an Ultra-Mobile Personal Computer (UMPC), a netbook, a Wearable Device, a vehicle-mounted device, or a Personal Digital Assistant (PDA), etc. It should be noted that a specific type of the terminal is not limited in an embodiment of the present disclosure.

It should be understood that the terminal is also referred to as user equipment (UE), a mobile station (MS), a mobile terminal (MT), etc., and the terminal is a device that provides users with voice and/or data connectivity, for example, a handheld device or a vehicle-mounted device with a wireless connection function, and so on. Some examples of the terminal are: a mobile phone, a tablet computer, a notebook computer, a palmtop computer, a mobile internet device (MID), a wearable device, a virtual reality (VR) device, a augmented reality (AR) equipment, a wireless terminals in industrial control, a wireless terminal in self-driving, a wireless terminal in remote medical surgery, and a wireless terminal in smart grid, a wireless terminal in transportation safety, a wireless terminal in a smart city, and a wireless terminal in a smart home, etc.

The network device in this article may be a node (or device) in a Radio Access Network (RAN), which may also be called a base station. Some examples of an RAN node are: a gNB, a transmission reception point (TRP), an evolved Node B (eNB), a radio network controller (RNC), a Node B (NB), a base station controller (BSC), a base transceiver station (BTS), a home base station (for example, a home evolved NodeB, or a home Node B, HNB), a base band unit (BBU)), or a wireless fidelity (Wifi) access point (AP), etc. In addition, in a network structure, the RAN may include a centralized unit (CU) node and a distributed unit (DU) node.

Although, in the present disclosure, a 3GPP NR system is taken as an example to illustrate various embodiments, applicable communication systems include but are not limited to 5G systems or evolved systems thereof, and other orthogonal frequency division multiplexing (OFDM) systems based on a DFT-Spread OFDM (DFT-S-OFDM, DFT extended OFDM) system, etc.

Figure 4:
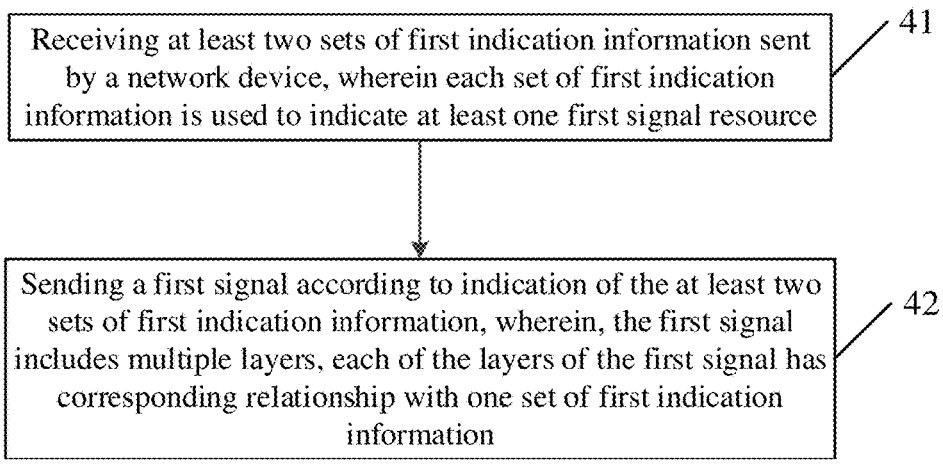
FIG. 4 is a first step diagram of a signal transmission method provided in an embodiment of the present disclosure.

As shown in FIG. 4, an embodiment of the present disclosure provides a signal transmission method, and the method is performed by a terminal and includes Step 41 and Step 42.

Step 41: receiving at least two sets of first indication information sent by a network device, wherein each set of first indication information is used to indicate at least one first signal resource.

Step 42: sending, according to indication of the at least two sets of first indication information, a first signal; wherein, the first signal includes multiple layers, each of the layers of the first signal has corresponding relationship with one set of first indication information, respectively.

In an embodiment of the present disclosure, each set of first indication information corresponds to one antenna panel, that is, each of the layers of the first signal corresponds to one antenna panel, and multiple layers of the first signal are mapped to at least two antenna panels for joint transmission.

As an embodiment, the first signal is a physical uplink shared channel (PUSCH).

Figure 5:
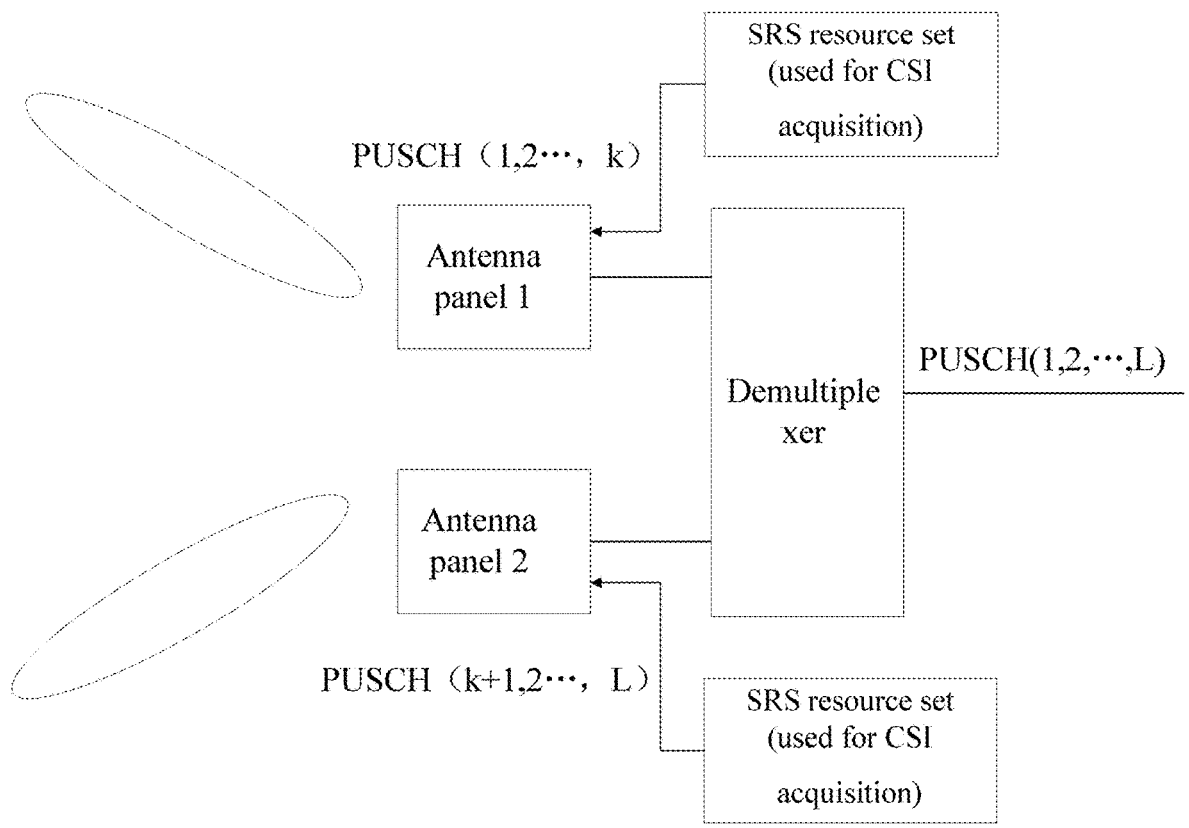
FIG. 5 is a schematic diagram of a principle of joint transmission of multiple antenna panels in a signal transmission method provided in an embodiment of the present disclosure.

For example, FIG. 5 shows a schematic diagram of transmission of a PUSCH for a terminal including 2 antenna panels (an antenna panel 1 and an antenna panel 2, respectively). The PUSCH includes L layers, L is an integer greater than or equal to 2. As shown in FIG. 5, layers1, . . . , k of the PUSCH are sent through the antenna panel 1, and layers k+1, . . . , L of the PUSCH are sent through the antenna panel 2. That is, the layers 1, . . . , k of the PUSCH all correspond to the antenna panel 1, and the layers k+1, . . . , L of the PUSCH all correspond to antenna panel 2; in other words, the layers 1, . . . , k of the PUSCH all have a corresponding relationship with a first set of first indication information (the first set of first indication information is used to indicate at least one signal resource for the antenna panel 1), and the layers k+1, . . . , L of the PUSCH all have a corresponding relationship with a second set of first indication information (the second set of first indication information is used to indicate at least one signal resource for the antenna panel 2).

As an embodiment, prior to Step 41, the method further includes:
receiving first configuration information sent by the network device, wherein the first configuration information is used to configure at least one first signal resource for the terminal;
sending, according to the first configuration information, a second signal to the network device.

The at least one first signal resource indicated by each set of the first indication information is: at least one first signal resource selected by the network device from the first signal resource configured by the first configuration information.

As an embodiment, there is a corresponding relationship between the first signal resource indicated by the first indication information sent by the network device and the first signal resource configured by the first configuration information sent by the network device. For example, the first configuration information configures a specific type of SRS (for example, SRS or aperiodic SRS used for codebook-based uplink transmission), regardless of whether other types of SRS are configured; then the first signal resource indicated by the first indication information is also the specific type of SRS.

It should be noted that, the second signal may specifically be a sounding reference signal (SRS) used for channel state information (CSI) acquisition (a 3GPP NR system related protocol is taken as an example, a configuration mode of an SRS resource for CSI acquisition in a codebook-based uplink transmission mode is that: if usage in a high-layer parameter SRS-ResourceSet corresponding to an SRS resource set is configured as 'codebook', then the SRS resource set is an SRS resource set for CSI acquisition in a codebook-based uplink transmission mode. A configuration mode of an SRS resource for CSI acquisition in a non-codebook-based uplink transmission mode is that: if usage in a high-layer parameter SRS-ResourceSet corresponding to an SRS resource set is configured as 'nonCodebook', then the SRS resource set is an SRS resource set for CSI acquisition in a non-codebook-based uplink transmission mode). After the terminal sends the second signal to the network device, the network device measures the second signal, selects at least one first signal resource from the first signal resource corresponding to the second signal, and informs the terminal of the selected first signal resource through the first indication information.

Accordingly, Step 42 includes:
sending the first signal by using an antenna panel used when sending the second signal corresponding to the at least one first signal resource indicated by each set of first indication information respectively.

Sending, according to the indication of the at least two sets of first indication information, the first signal includes: sending the first signal by using an antenna panel used when sending the second signal corresponding to first signal resources indicated by the at least two sets of first indication information.

In short, the antenna panel used for sending the first signal is: an antenna panel used when sending the second signal corresponding to the at least one first signal resource indicated by each set of first indication information.

It should be noted that, the foregoing "sending, according to the first configuration information, the second signal to the network device" includes at least the following two cases.

(1) For a periodic first signal resource (specifically, an SRS resource), the terminal may implement periodic transmission according to the first configuration information;

(2) For an aperiodic or semi-persistent first signal resource (specifically, an SRS resource), the network device also needs to send a trigger signaling, and the terminal may implement transmission according to the first configuration information and triggering of the trigger signaling.

It should be noted that, in an embodiment of the present disclosure, manners for configuring the first signal resource based on the first configuration information include at least the following two manners.

Manner 1: in a case that only one first signal resource including multiple antenna ports is configured by the first configuration information, prior to Step 42, the method further includes:

receiving first grouping information sent by the network device, wherein the first grouping information is used to indicate grouping of the antenna ports of the first signal resource configured by the first configuration information.

Each set of first indication information corresponds to an antenna port group, and each set of first indication information in the at least two sets of first indication information is used to indicate at least one antenna port from a corresponding antenna port group.

The first grouping information may be included in the first configuration information, or may be sent separately, which is not specifically limited here.

In short, the network device configures a first signal resource (specifically, an SRS resource) for the terminal, and the first signal resource includes multiple antenna ports. The network device acquires CSI according to the first signal resource. For example, the network device may configure a cross-panel SRS resource, when the UE sends an SRS corresponding to the SRS resource, different groups of antenna ports (specifically, SRS ports) are mapped to different antenna panels; the network device acquires one CSI according to the SRS.

Manner 2: in a case that multiple first signal resources are configured by the first configuration information, prior to Step 42, the method further includes:

receiving second grouping information sent by the network device, wherein the second grouping information is used to indicate grouping of the first signal resources configured by the first configuration information.

Each set of first indication information corresponds to a first signal resource group, and each set of first indication information in the at least two sets of first indication information is used to indicate at least one first signal resource from a corresponding first signal resource group.

Likewise, the second grouping information may be included in the first configuration information, or may be sent separately, which is not specifically limited here.

In short, the network device configures multiple first signal resource groups for the terminal, and each first signal resource group includes at least one first signal resource (specifically, SRS resource). Or, the network device configures a first signal resource group for the terminal, and the first signal resource group includes multiple first signal resources. Optionally, one first signal resource group is one SRS resource set.

Based on an assumption that a first signal corresponding to each first signal resource is based on single-point transmission (that is, it is assumed that only an antenna corresponding to this first signal resource is used for transmission during uplink transmission, and other first signal resources are not considered), the network device acquires CSI corresponding to the first signal resource; or, the network device acquires a joint CSI by combining multiple first signals (that is, it is assumed that the terminal may use an antenna corresponding to multiple first signal resources for uplink transmission).

For example, the network device independently configures an SRS resource (per-panel SRS resource) for each antenna panel. Under the assumption of single-point transmission, the network device acquires CSI (per-panel CSI) of each antenna panel through an SRS used for each antenna panel; or, under the assumption of joint transmission, the network device acquires cross-panel CSI (for example, one cross-panel CSI corresponds to multiple panels) through SRSs connected via cross-panel.

As an embodiment, different sets of first indication information are coded independently; or, the at least two sets of first indication information are coded jointly.

In some embodiments of the present disclosure, when the at least two sets of first indication information are jointly coded, the at least two sets of first indication information are indicated by the same information field, and one state of the information field indicates all sets of first indication information at the same time. It is taken as an example that, the network device sends two sets of first indication information, wherein each set of first indication information is used to indicate an SRS resource in a first signal resource group, each first signal resource group includes two SRS resources, and the two sets of first indication information adopt 2-bit joint coding, one of the following joint coding manners may be used.

| Joint coding state | A first set of first indication information | A second set of first indication information |
| --- | --- | --- |
| 0 | SRI = 0 | SRI = 0 |
| 1 | SRI = 0 | SRI = 1 |
| 2 | SRI = 1 | SRI = 0 |
| 3 | SRI = 1 | SRI = 1 |

SRI=0 is used to indicate a first SRS resource in a corresponding first signal resource group, and SRI=1 is used to indicate a second SRS resource in the corresponding first signal resource group. That is, SRI in a second column corresponds to a first set of first indication information, and SRI in the third column corresponds to a second set of first indication information. In this way, two sets of first indication information may be indicated by sharing joint coding information in the same bit field.

As another embodiment of joint coding of at least two sets of first indication information, at least two sets of first indication information are indicated by using the same information field, but each set of first indication information uses an independent bit. It is also taken as an example that, the network device sends two sets of first indication information, wherein each set of first indication information is used to indicate an SRS resource of a first signal resource group, each first signal resource group includes two SRS resources. In this way, the following manner of joint coding of at least two sets of first indication information may be used.

| Bit field state | A first set of first indication information | A second set of first indication information |
|---|---|---|
| 00 | SRI = 0 | SRI = 0 |
| 01 | SRI = 0 | SRI = 1 |
| 10 | SRI = 1 | SRI = 0 |
| 11 | SRI = 1 | SRI = 1 |

A first bit from the left of the bit field is used to indicate a first set of first indication information, and a second bit from the left is used to indicate a second set of first indication information, and these two bits together form an information field jointly coded. In the example table, SRI=0 is used to indicate a first SRS resource in a corresponding first signal resource group, and SRI=1 is used to indicate a second SRS resource in the corresponding first signal resource group; SRI in the second column corresponds to a first group of first signal resource groups, and SRI in the third column corresponds to a second group of first signal resource groups.

Different sets of first indication information are coded independently, then, different sets of first indication information may correspond to different information fields, respectively.

As another embodiment, different sets of the first indication information are indicated via different physical layer signalings; that is, multiple sets of first indication information are respectively indicated to the terminal via multiple independent L1 signalings. For example, multiple sets of first indication information are respectively indicated to the terminal through multiple PDCCHs.

Or, the at least two sets of first indication information are indicated via the same physical layer signaling. That is, multiple sets of first indication information are indicated to the terminal via L1 signaling. For example, multiple sets of first indication information are indicated to the terminal through a physical downlink control channel (PDCCH) (the PDCCH is a PDCCH carrying an uplink grant for scheduling PUSCH).

It should be noted that, the way of indicating through different signalings compared to the way of indicating through the same signaling may result in larger delay and overhead.

Further, in the embodiment of the present disclosure, the first configuration information configures at least one first signal resource subgroup, and each first signal resource subgroup includes at least one first signal resource; wherein, each set of first indication information corresponds to a first signal resource subgroup. That is, multiple first signal resources configured by the first configuration information may be divided into multiple first signal resource subgroups. Optionally, one first signal resource subgroup is one SRS resource set (for example, an SRS resource set in a 3GPP NR system).

Continuing the previous example, the method in the embodiment of the present disclosure includes:
  receiving second indication information of first signal resource subgroups corresponding to the at least two sets of first indication information sent by the network device;
  determining, according to the second indication information, the first signal resource subgroups corresponding to the at least two sets of first indication information.

For example, the network device configures N SRS resource sets for the terminal, but the network device only indicates M pieces of first indication information, M<N; in this case, the network device sends second indication information to the terminal, and the terminal may determine, according to the second indication information, which M of the N SRS resource sets configured by the network device correspond to the M pieces of first indication information indicated by the network device.

Assuming that the terminal has N1 antenna panels in total, the base station instructs the terminal to use a subset of the N1 antenna panels (for example, N antenna panels among the N1 antenna panels, N<=N) to transmit the first signal. Specifically, the base station indicates an index of a selected antenna panel via signaling; or, an index of a selected antenna panel is not indicated via signaling, and a selected antenna panel may be implicitly indicated by a value of the first indication information (specifically, an SRI).

As an embodiment, in a case that only one first signal resource subgroup is configured by the first configuration information, and the first signal resource subgroup includes at least one first signal resource, each set of first indication information is used to indicate: at least one first signal resource selected by the network device from the first signal resource subgroup.

For example, the network device configures an SRS resource set (equivalent to the foregoing first signal resource subgroup), and informs the terminal of the configuration information. Based on the configuration information acquired from the network device, the terminal sends the SRS resource set (specifically, all SRS resources in the SRS resource set) through an antenna panel n. Beamforming may be performed on different SRS resources in the same SRS resource set by the same or different analog beams, for example, a preferred transmission beam is determined by the network device for the antenna panel n. Which analog beam is used to perform beamforming and send SRS may be controlled by the network device, for example, via a semi-static configuration or L1 dynamic signaling. The network device receives and measures an SRS resource sent through the panel n, selects an SRS resource therefrom, and informs the terminal of the selected SRS resource via indication signaling (first indication information). For example, an SRI (SRS Resource Indication) is used to indicate an SRS resource selected by the network device.

As another embodiment, in a case that the first configuration information configures multiple first signal resource subgroups for the terminal, and each first signal resource subgroup includes a first signal resource, each set of first indication information is used to indicate: at least one first signal resource subgroup selected by the network device from the multiple first signal resource subgroups.

For example, the network device configures multiple SRS resource sets (equivalent to multiple first signal resource subgroups), and each SRS resource set includes an SRS resource. The base station informs the terminal of the configuration information. The configuration information may also include information about a corresponding relationship between an SRS resource set and an antenna panel. The network device configures or instructs the terminal to send one or more SRS resource sets. The terminal sends one or more SRS resource sets according to indication information of the base station. Beamforming may be performed on different SRS resources in the same SRS resource set by the same or different analog beams, for example, a preferred transmission beam is determined by the base station for an antenna panel. Which analog beam is used to perform beamforming and send SRS may be controlled by the base station, for example, via a semi-static configuration or L1 dynamic signaling. The base station receives and measures SRS resource sets sent by the terminal, selects an SRS resource set therefrom, and indicates the terminal of the selected SRS resource set via indication signaling (first indication information). For example, an SRI (SRS Resource Indication) is used to indicate an SRS resource set selected by the network device. For another example, the network device indicates, to the terminal through an indication field for an SRS resource set in DCI, an SRS resource set selected by the network device.

Based on the above manner, in an embodiment of the present disclosure, each set of first indication information indicates at least one first signal resource by at least one of:
  indicating a local index of the at least one first signal resource in the first signal resource subgroup where the at least one first signal resource is located;
  indicating a global index of the at least one first signal resource in all first signal resources configured by the network device;
  indicating an absolute index of the at least one first signal resource in all first signal resources configured by the network device;
  indicating a local index of the first signal resource subgroup, where the at least one first signal resource is located, in first signal resource subgroups corresponding to an antenna panel corresponding to the first signal resource subgroup;
  indicating a global index of the first signal resource subgroup, where the at least one first signal resource is located, in all first signal resource subgroups configured by the network device;
  indicating an absolute index of the first signal resource subgroup, where the at least one first signal resource is located, in all first signal resource subgroups configured by the network device.

For example, an indication of a local index is as follows: assuming that the terminal includes 3 antenna panels, the numbering values of SRS resources in each SRS resource set are: SRS resource set 1: [1 2 . . . 8], SRS resource set 2: [17 . . . 24], SRS resource set 3: [25 . . . 32]. Then SRI indications corresponding to each SRS resource set (antenna panel) [SRI1, SRI2, . . . SRI N1]=[1 1 1] means that the network device indicates a first SRS resource in each SRS resource set.

For another example, an indication of a global index is as follows: assuming that the terminal includes 3 antenna panels, the numbers of SRS resources in each SRS resource set are: SRS resource set 1: [1 2 . . . 8], SRS resource set 2: [17 . . . 24], SRS resource set 3: [25 . . . 32]. Then [SRI1, SRI2, . . . SRI N1]=[1 9 17] means that SRS resources indicated by the network device in three SRS resource sets are the first, the ninth, and the seventeenth SRS resources in configured SRS resources for CSI acquisition, respectively, that is, the network device indicates the first SRS resource in each SRS resource set.

For another example, an indication of an absolute index is as follows: assuming that the terminal includes three antenna panels, the numbering values of SRS resources in each SRS resource set are: SRS resource set 1: [1 2 . . . 8], SRS resource set 2: [17 . . . 24], SRS resource set 3: [25 . . . 32]. [SRI1, SRI2, . . . SRIN1]=[1 17 25] means that the network device indicates the first SRS resource in each SRS resource set.

Further, in the embodiment of the present disclosure, prior to Step 42, the method further includes:
  acquiring the corresponding relationship between each of the layers of the first signal and each set of first indication information.

Specifically, acquiring the corresponding relationship between each of the layers of the first signal and each set of first indication information includes:
  receiving information about the corresponding relationship between each of the layers of the first signal and each set of first indication information sent by the network device;
  acquiring, according to the information about the corresponding relationship, the corresponding relationship between each of the layers of the first signal and each set of first indication information.

Optionally, the information about the corresponding relationship is indicated by at least one of the following manners.

Manner 1: a layer corresponding to each set of first indication information is indicated in a bitmap by an information field with a length of K bits; wherein K is an integer greater than or equal to 2; K is a non-dynamic value (for example, a fixed value or a semi-static value) and the terminal knows the value of K in advance. For example, a bit value of 1 (or 0) indicates that a corresponding layer is transmitted with the same transmission characteristics (for example, the antenna panel and beam used) as an SRS indicated by the SRI. K may be equal to a transmission rank L or greater than L (L is the number of antenna panels). For another example, K may be the maximum number of PUSCH transmission layers supported by the terminal, or the maximum number of PUSCH transmission layers indicated by the base station. The total number of 1 (or 0) in the bitmaps corresponding to all SRIs should be equal to L.

Manner 2: the number Sn of layers corresponding to each set of first indication information is indicated; the number of layers may be coded jointly with the first indication information or coded independently. For example, if n=1, $SRI_n$ corresponds to layers 1 to $S_1$; if n>1, $SRI_n$ corresponds to layers S+1, . . . , S+Sn, wherein $$S = \sum_{k=1}^{k=n-1} S_k \bigg).$$

Manner 3: a maximum layer identity of a layer of layers corresponding to each set of first indication information is indicated; the maximum layer identity may be coded jointly with the first indication information or coded independently. For example, n=1, $SRI_n$ corresponds to layers 1 to $S_1$; if n>1, $SRI_n$ corresponds to layers $S_{n-1}+1$, . . . , $S+S_n$).

It should be noted that, compared with the manner 1, advantage of the manner 2 and the manner 3 is smaller overhead, but the manner 2 and the manner 3 require that PUSCH layers corresponding to the same SRI must be continuous, which enhances limit on scheduling. Therefore, a manner to be used may be judged according to specific circumstances in actual applications.

Optionally, acquiring the corresponding relationship between each of the layers of the first signal and each set of first indication information includes:
  there being a one-to-one corresponding relationship between antenna panels of the terminal and the sets of first indication information, receiving information about the corresponding relationship between the layers of the first signal and the transmission panels of the terminal sent by the network device;

acquiring, according to the information about the corresponding relationship, the corresponding relationship between the layers of the first signal and the transmission panels of the terminal.

Optionally, the information about the corresponding relationship is indicated by at least one of the following manners.

Manner 1: a layer corresponding to each antenna panel is indicated in a bitmap by an information field with a length of K bits; wherein K is an integer greater than or equal to 2; K is a non-dynamic value (for example, a fixed value or a semi-static value) and the terminal knows the value of K in advance. For example, a bit value of 1 (or 0) indicates that a corresponding layer is transmitted with the same transmission characteristics (for example, the antenna panel and beam used) as an SRS indicated by the SRI. K may be equal to a transmission rank L or greater than L (L is the number of antenna panels). For another example, K may be the maximum number of PUSCH transmission layers supported by the terminal, or the maximum number of PUSCH transmission layers indicated by the base station. The total number of 1 (or 0) in the bitmaps corresponding to all SRIs should be equal to L.

Manner 2: the number Sn of layers corresponding to each antenna panel is indicated; the number of layers may be coded jointly with the first indication information or coded independently. For example, if n=1, $SRI_n$ corresponds to layers 1 to $S_1$; if n>1, $SRI_n$ corresponds to layers S+1, ..., S+Sn, where $$S = \sum_{k=1}^{k=n-1} S_k.$$

Manner 3: a maximum layer identity of layers corresponding to each antenna panel is indicated; the maximum layer identity may be coded jointly with the first indication information or coded independently. For example, n=1, $SRI_n$ corresponds to layers 1 to $S_1$; if n>1, $SRI_n$ corresponds to layers $S_{n-1}+1, \ldots, S+S_n$).

It should be noted that, compared with the manner 1, advantage of the manner 2 and the manner 3 is smaller overhead, but the manner 2 and the manner 3 require that PUSCH layers corresponding to the same SRI must be continuous, which enhances limit on scheduling. Therefore, a manner to be used may be judged according to specific circumstances in actual applications.

Further, in the embodiment of the present disclosure, prior to sending, according to the first configuration information, the second signal to the network device, the method further includes:

receiving beam indication information sent by the network device, wherein the beam indication information is used to indicate a transmission beam corresponding to the first signal resource included in the first configuration information;

Sending, according to the first configuration information, the second signal to the network device includes:

sending, according to the first configuration information, the second signal to the network device by using the transmission beam indicated by the beam indication information.

That is, prior to sending the second signal (the second signal is an SRS used for CSI acquisition), the terminal needs to determine a preferred transmission beam of each panel.

Accordingly, prior to receiving the beam indication information sent by the network device, the method further includes:

receiving third indication information sent by the network device, wherein the third indication information is used to instruct the terminal to send third signals; the third signals are multiple sets of uplink reference signal resources used for beam training, and each set of uplink reference signal resources includes at least one uplink reference signal resource;

sending, according to the third indication information, the third signals by using multiple antenna panels of the terminal, respectively.

For example, for each antenna panel, the following processes may be repeated. The following description is made by taking the panel n as an example.

The network device configures an SRS resource set, and informs UE of the configuration information.

Based on the configuration information received from the network device, the terminal sends (all SRS resources) in the SRS resource set through an antenna panel n. Beamforming is performed on different SRS resources in the same SRS resource set by the same or different analog beams. Optionally, the terminal determines by itself whether to use the same analog beam and/or determines a used analog beam by itself, which may be transparent to the base station. Of course, the present disclosure is also applicable to situations where an analog beam for transmitting SRS is not transparent to the base station.

For each antenna panel, the base station may determine a preferred analog transmission beam, $[BM_{opt,n}]$ is used to represent a preferred beam of an n-th antenna panel, which corresponds to a transmission beam used when sending a preferred SRS selected by the base station. The base station may determine the preferred analog transmission beam based on a certain criterion. This criterion includes, but is not limited to, Signal to Interference plus Noise Ratio (SINR)/Reference Signal Receiving Power (RSRP)/Reference Signal Receiving Quality (RSRQ) measurements on different SRS resources. It is assumed that $[SRS_{opt,n}]$ is used to represent the preferred SRS resource of the n-th antenna panel determined by the base station.

In this procedure, the base station may also determine a preferred receiving beam. Assuming that single-panel transmission is performed on each antenna panel, and a preferred receiving beam may be determined separately, there is a preferred receiving beam for each transmission panel. In this case, different SRS resource sets should be transmitted on non-overlapping time/frequency resources. Optionally, the base station determines a receiving beam for all panels at the same time. Or, different SRS resource sets (corresponding to different antenna panels) may be transmitted on the same time/frequency resource.

It should be pointed out that, optionally, the base station may select multiple transmission beams for each antenna panel, for example $[SRS_{opt,n,1}, SRS_{opt,n,2}, \ldots]$ correspond to a optimal transmission beam of the panel n, a inferior optimal transmission beam of the panel n, and so on, respectively.

In summary, in the embodiment of the present disclosure, a first signal including multiple layers is sent based on at least two sets of first indication information sent by the network device, each of the layers of the first signal has corresponding relationship with a set of the first indication information, and each set of the first indication information corresponds to an antenna panel, so that it is allowed that multi-antenna panel joint transmission of the multiple layers is performed by multiple antenna panels at the same time; and each antenna panel corresponds to a set of first indication information, so that the network device selects an independent beamforming beam for each antenna panel (the beamforming beam is indicated by the first signal resource), so as to obtain better beamforming gain and improve performance of uplink transmission.

Figure 6:
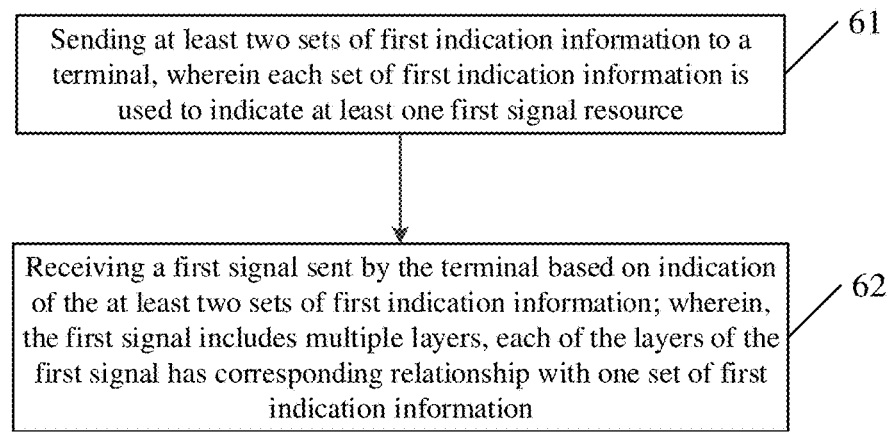
FIG. 6 is a second step diagram of a signal transmission method provided in an embodiment of the present disclosure.

As shown in FIG. 6, an embodiment of the present disclosure provides a signal transmission method, and the method is performed by a network device and includes Step 61 and Step 62.

Step 61: sending at least two sets of first indication information to a terminal, wherein each set of first indication information is used to indicate at least one first signal resource.

Step 62: receiving a first signal sent by the terminal based on indication of the at least two sets of first indication information; wherein, the first signal includes multiple layers, each of the layers of the first signal has corresponding relationship with one set of first indication information, respectively.

In an embodiment of the present disclosure, each set of first indication information corresponds to one antenna panel, that is, each of the layers of the first signal corresponds to one antenna panel, and multiple layers of the first signal are mapped to at least two antenna panels for joint transmission.

As an embodiment, the first signal is a physical uplink shared channel (PUSCH).

For example, FIG. 5 shows a schematic diagram of transmission of a PUSCH for a terminal including 2 antenna panels (antenna panel 1 and antenna panel 2, respectively). The PUSCH includes L layers, L is an integer greater than or equal to 2. As shown in FIG. 5, layers1, . . . , k of the PUSCH are sent through the antenna panel 1, and layers k+1, . . . , L of the PUSCH are sent through the antenna panel 2. That is, the layers 1, . . . , k of the PUSCH all correspond to the antenna panel 1, and the layers k+1, . . . , L of the PUSCH all correspond to antenna panel 2; in other words, the layers 1, . . . , k of the PUSCH all have a corresponding relationship with a first set of first indication information (the first set of first indication information is used to indicate at least one signal resource for the antenna panel 1), and the layers k+1, . . . , L of the PUSCH all have a corresponding relationship with a second set of first indication information (the second set of first indication information is used to indicate at least one signal resource for the antenna panel 2).

As an embodiment, prior to Step 61, the method further includes:
  sending first configuration information to the terminal, wherein the first configuration information is used to configure at least one first signal resource for the terminal;
  receiving a second signal sent based on the first configuration information by the terminal;
  measuring the second signal, selecting at least one first signal resource from first signal resources corresponding to the second signal;
  wherein the at least one first signal resource indicated by each set of first indication information is: the at least one first signal resource selected by the network device.

As an embodiment, there is a corresponding relationship between the first signal resource indicated by the first indication information sent by the network device and the first signal resource configured by the first configuration information sent by the network device. For example, the first configuration information configures a specific type of SRS (for example, SRS or aperiodic SRS used for uplink transmission based on a codebook), regardless of whether other types of SRS are configured; then the first signal resource indicated by the first indication information is also the specific type of SRS.

It should be noted that, the second signal may specifically be a sounding reference signal (SRS) used for channel state information (CSI) acquisition. After the terminal sends the second signal to the network device, the network device measures the second signal, selects at least one first signal resource from the first signal resources corresponding to the second signal, and informs the terminal of the selected first signal resource through the first indication information.

Accordingly, Step 62 includes:
  receiving the first signal sent by the terminal by using antenna panels used respectively when the terminal sends the second signal corresponding to the at least one first signal resource indicated by each set of first indication information.

In short, the antenna panel used for sending the first signal is: an antenna panel used when sending the second signal corresponding to the at least one first signal resource indicated by each set of first indication information.

It should be noted that, the foregoing "receiving the second signal sent by the terminal based on the first configuration information" includes at least the following two cases.

(1) For a periodic first signal resource (specifically, an SRS resource), the terminal may implement periodic transmission according to the first configuration information;

(2) For an aperiodic or semi-persistent first signal resource (specifically, an SRS resource), the network device also needs to send a trigger signaling, and the terminal may implement transmission according to the first configuration information and triggering of the trigger signaling.

It should be noted that, in an embodiment of the present disclosure, manners for configuring the first signal resource based on the first configuration information include at least the following two manners.

Manner 1: in a case that only one first signal resource including multiple antenna ports is configured by the first configuration information, prior to Step 62, the method further includes:
  sending first grouping information to the terminal, wherein the first grouping information is used to indicate grouping of the antenna ports of the first signal resource configured by the first configuration information;
  wherein, each set of first indication information corresponds to an antenna port group, and each set of first indication information in the at least two sets of first indication information is used to indicate at least one antenna port from a corresponding antenna port group.

The first grouping information may be included in the first configuration information, or may be sent separately, which is not specifically limited here.

In short, the network device configures a first signal resource (specifically, an SRS resource) for the terminal, and the first signal resource includes multiple antenna ports. The network device acquires a CSI according to the first signal resource. For example, the network device may configure a cross-panel SRS resource, when the UE sends an SRS corresponding to the SRS resource, different antenna port groups (specifically, SRS ports) are mapped to different antenna panels; the network device acquires a CSI according to the SRS.

Manner 2: in a case that multiple first signal resources are configured by the first configuration information, prior to Step 62, the method further includes:

sending second grouping information to the terminal, wherein the second grouping information is used to indicate grouping of the first signal resources configured by the first configuration information;

wherein, each set of first indication information corresponds to a first signal resource group, and each set of first indication information in the at least two sets of first indication information is used to indicate at least one first signal resource from a corresponding first signal resource group.

Likewise, the second grouping information may be included in the first configuration information, or may be sent separately, which is not specifically limited here.

In short, the network device configures multiple first signal resource groups for the terminal, and each first signal resource group includes at least one first signal resource (specifically, SRS resource). Or, the network device configures a first signal resource group for the terminal, and the first signal resource group includes multiple first signal resources.

Based on an assumption that a first signal corresponding to each first signal resource is based on single-point transmission (that is, it is assumed that only an antenna corresponding to this first signal resource is used for transmission during uplink transmission, and other first signal resources are not considered), the network device acquires a CSI corresponding to the first signal resource; or, the network device acquires joint CSI by combining multiple first signals (that is, it is assumed that the terminal may use antennas corresponding to multiple first signal resources for uplink transmission).

For example, the network device independently configures an SRS resource (per-panel SRS resource) for each antenna panel. Under the assumption of single-point transmission, the network device acquires CSI (per-panel CSI) of each antenna panel through SRSs respectively used for antenna panels; or, under the assumption of joint transmission, the network device acquires cross-panel CSI (for example, one cross-panel CSI corresponds to multiple panels) through SRSs connected via cross-panel.

As an embodiment, different sets of first indication information are coded independently; or, the at least two sets of first indication information are coded jointly.

As another embodiment, different sets of the first indication information are indicated via different physical layer signalings; that is, multiple sets of first indication information are respectively indicated to the terminal via multiple independent L1 signalings. For example, multiple sets of first indication information are respectively indicated to the terminal through multiple PDCCHs.

Or, the at least two sets of first indication information are indicated via the same physical layer signaling. That is, multiple sets of first indication information are indicated to the terminal via one L1 signaling. For example, multiple sets of first indication information are indicated to the terminal through a physical downlink control channel (PDCCH) (the PDCCH is a PDCCH carrying an uplink grant for scheduling PUSCH).

It should be noted that, the way of indicating through different signalings may result in larger delay and overhead compared to the way of indicating through the same signaling.

Further, in the embodiment of the present disclosure, the first configuration information configures at least one first signal resource subgroup, and each first signal resource subgroup includes at least one first signal resource; wherein, each set of first indication information corresponds to a first signal resource subgroup. That is, multiple first signal resources configured by the first configuration information may be divided into multiple first signal resource subgroups, the first signal resource subgroup may also become a first signal resource set (specifically, it may be an SRS resource set).

Continuing the previous example, the method in the embodiment of the present disclosure includes:

sending second indication information of first signal resource subgroups corresponding to the at least two sets of first indication information to the terminal;

determining, according to the second indication information, the first signal resource subgroups corresponding to the at least two sets of first indication information.

For example, the network device configures N SRS resource sets for the terminal, but the network device only indicates M pieces of first indication information, M<N; in this case, the network device sends second indication information to the terminal, and the terminal may determine, according to the second indication information, which M of the N SRS resource sets configured by the network device correspond to the M pieces of first indication information indicated by the network device.

Assuming that the terminal has N1 antenna panels in total, the base station instructs the terminal to use a subset of the N1 antenna panels (for example, N antenna panels among the N1 antenna panels, N<=N) to transmit the first signal. Specifically, the base station indicates an index of a selected antenna panel via signaling; or, an index of a selected antenna panel is not indicated via signaling, and a selected antenna panel may be implicitly indicated by a value of the first indication information (specifically, an SRI).

As an embodiment, in a case that only one first signal resource subgroup is configured by the first configuration information, and the first signal resource subgroup includes at least one first signal resource, each set of first indication information is used to indicate: at least one first signal resource selected by the network device from the first signal resource subgroup.

For example, the network device configures an SRS resource set (equivalent to the foregoing first signal resource subgroup), and informs the terminal of the configuration information. Based on the configuration information acquired from the network device, the terminal sends the SRS resource set (specifically, all SRS resources in the SRS resource set) through an antenna panel n. Beamforming may be performed on different SRS resources in the same SRS resource set by the same or different analog beams, for example, a preferred transmission beam is determined by the network device for the antenna panel n. Which analog beam is used to perform beamforming and send SRS may be controlled by the network device, for example, via a semi-static configuration or L1 dynamic signaling. The network device receives and measures an SRS resource sent through panel n, selects an SRS resource therefrom, and informs the terminal of the selected SRS resource via an indication signaling (first indication information). For example, an SRI (SRS Resource Indication) is used to indicate an SRS resource selected by the network device.

As another embodiment, in a case that the first configuration information configures multiple first signal resource subgroups for the terminal, and each first signal resource subgroup includes a first signal resource, each set of first indication information is used to indicate: at least one first signal resource subgroup selected by the network device from the multiple first signal resource subgroups.

For example, the network device configures multiple SRS resource sets (equivalent to multiple first signal resource subgroups), and each SRS resource set includes an SRS resource. The base station informs the terminal of the configuration information. The configuration information may also include information about a corresponding relationship between an SRS resource set and an antenna panel. The network device configures or instructs the terminal to send one or more SRS resource sets. The terminal sends one or more SRS resource sets according to indication information of the base station. Beamforming may be performed on different SRS resources in the same SRS resource set by the same or different analog beams, for example, a preferred transmission beam is determined by the base station for an antenna panel. Which analog beam is used to perform beamforming and send SRS may be controlled by the base station, for example, via a semi-static configuration or L1 dynamic signaling. The base station receives and measures an SRS resource set sent by the terminal, selects an SRS resource set therefrom, and indicates the terminal of the selected SRS resource set via one indication signaling (first indication information). For example, an SRI (SRS Resource Indication) is used to indicate an SRS resource set selected by the network device.

Based on the above manner, in an embodiment of the present disclosure, each set of first indication information indicates at least one first signal resource by at least one of:
  indicating a local index of the at least one first signal resource in the first signal resource subgroup where the at least one first signal resource is located;
  indicating a global index of the at least one first signal resource in all first signal resources configured by the network device;
  indicating an absolute index of the at least one first signal resource in all first signal resources where the at least one first signal resource configured by the network side device;
  indicating a local index of the first signal resource subgroup, where the at least one first signal resource is located, in first signal resource subgroups corresponding to an antenna panel corresponding to the first signal resource subgroup;
  indicating a global index of the first signal resource subgroup, where the at least one first signal resource is located, in all first signal resource subgroups configured by the network device;
  indicating an absolute index of the first signal resource subgroup, where the at least one first signal resource is located, in all first signal resource subgroups configured by the network device.

For example, an indication of a local index is as follows: assuming that the terminal includes 3 antenna panels, the numbering values of SRS resources in SRS resource sets are: SRS resource set 1: [1 2 . . . 8], SRS resource set 2: [17 . . . 24], SRS resource set 3: [25 . . . 32]. Then SRI indications corresponding to each SRS resource set (antenna panel) [SRI1, SRI2, . . . , SRI N1]=[1 1 1] means that the network device indicates the first SRS resource in each SRS resource set.

For another example, an indication of a global index is as follows: assuming that the terminal includes 3 antenna panels, the numbering values of SRS resources in each SRS resource set are: SRS resource set 1: [1 2 . . . 8], SRS resource set 2: [17 . . . 24], SRS resource set 3: [25 . . . 32]. Then [SRI1, SRI2, . . . SRI N1]=[1 9 17] means that SRS resources indicated by the network device in three SRS resource sets are the first, the ninth, and the seventeenth SRS resources in configured SRS resources for CSI acquisition, respectively, that is, the network device indicates the first SRS resource in each SRS resource set.

For another example, an indication of an absolute index is as follows: assuming that the terminal includes 3 antenna panels, the numbering values of SRS resources in each SRS resource set are: SRS resource set 1: [1 2 . . . 8], SRS resource set 2: [17 . . . 24], SRS resource set 3: [25 . . . 32]. [SRI1, SRI2, . . . SRIN1]=[1 17 25] means that the network device indicates the first SRS resource in each SRS resource set.

Further, in the embodiment of the present disclosure, prior to Step 62, the method further includes:
  sending, to the terminal, information about a corresponding relationship between each of the layers of the first signal and each set of first indication information, so that the terminal acquires, according to the information about the corresponding relationship, the corresponding relationship between each of the layers of the first signal and each set of first indication information.

Optionally, the information about the corresponding relationship is indicated by at least one of the following manners.

Manner 1: layers corresponding to each set of first indication information are indicated in a bitmap by an information field with a length of K bits; wherein K is an integer greater than or equal to 2; K is a non-dynamic value (for example, a fixed value or a semi-static value) and the terminal knows the value of K in advance. For example, a bit value of 1 (or 0) indicates that a corresponding layer is transmitted with the same transmission characteristics (for example, the antenna panel and beam used) as an SRS indicated by the SRI. K may be equal to a transmission rank L or greater than L (L is the number of antenna panels). For another example, K may be the maximum number of PUSCH transmission layers supported by the terminal, or the maximum number of PUSCH transmission layers indicated by the network device. The total number of 1 (or 0) in the bitmaps corresponding to all SRIs should be equal to L.

Manner 2: the number of layers corresponding to each set of first indication information is indicated; the number of layers may be coded jointly with the first indication information or coded independently. For example, if n=1, $SRI_n$ corresponds to layers 1 to $S_1$; if n>1, $SRI_n$ corresponds to layers S+1, . . . S+Sn, where $$S = \sum_{k=1}^{k=n-1} S_k\Bigg).$$

Manner 3: a maximum layer identity of a layer of layers corresponding to each set of first indication information is indicated; the maximum layer identity may be coded jointly with the first indication information or coded independently.

For example, n=1, $SRI_n$ corresponds to layers 1 to $S_1$; if n>1, $SRI_n$ corresponds to layers $S_{n-1}+1, \ldots S+S_n$).

It should be noted that, compared with the manner 1, advantage of the manner 2 and the manner 3 is smaller overhead, but the manner 2 and the manner 3 require that PUSCH layers corresponding to the same SRI must be continuous, which enhance limit on scheduling. Therefore, a manner to be used may be judged according to specific circumstances in actual applications.

Optionally, acquiring the corresponding relationship between each of the layers of the first signal and each set of first indication information includes:

there being a one-to-one corresponding relationship between antenna panels of the terminal and the first indication information, receiving information about the corresponding relationship between the layers of the first signal and the transmission panels of the terminal sent by the network device;

acquiring, according to the information about the corresponding relationship, the corresponding relationship between the layers of the first signal and the transmission panels of the terminal.

Optionally, the information about the corresponding relationship is indicated by at least one of the following manners.

Manner 1: layers corresponding to each transmission panel are indicated in a bitmap by an information field with a length of K bits; wherein K is an integer greater than or equal to 2; K is a non-dynamic value (for example, a fixed value or a semi-static value) and the terminal knows the value of K in advance. For example, a bit value of 1 (or 0) indicates that a corresponding layer is transmitted with the same transmission characteristics (for example, the antenna panel and beam used) as an SRS indicated by the SRI. K may be equal to a transmission rank L or greater than L (L is the number of antenna panels). For another example, K may be the maximum number of PUSCH transmission layers supported by the terminal, or the maximum number of PUSCH transmission layers indicated by the network device. The total number of 1 (or 0) in the bitmaps corresponding to all SRIs should be equal to L.

Manner 2: the number Sn of layers corresponding to each antenna panel is indicated; the number of layers may be coded jointly with the first indication information or coded independently. For example, if n=1, $SRI_n$ corresponds to layers 1 to $S_1$; if n>1, $SRI_n$ corresponds to layers $S+1, \ldots S+Sn$, where $$S = \sum_{k=1}^{k=n-1} S_k.$$

Manner 3: a maximum layer identity of a layer of layers corresponding to each antenna panel is indicated; the maximum layer identity may be coded jointly with the first indication information or coded independently. For example, n=1, $SRI_n$ corresponds to layers 1 to $S_1$; if n>1, $SRI_n$ corresponds to layers $S_{n-1}+1, \ldots S+S_n$).

It should be noted that, compared with the manner 1, advantage of the manner 2 and the manner 3 is smaller overhead, but the manner 2 and the manner 3 require that PUSCH layers corresponding to the same SRI must be continuous, which enhances limit on scheduling. Therefore, a manner to be used may be judged according to specific circumstances in actual applications.

Further, in the embodiment of the present disclosure, prior to receiving the second signal sent by the terminal based on the first configuration information, the method further includes:

sending beam indication information to the terminal, wherein the beam indication information is used to indicate a transmission beam corresponding to the first signal resource included in the first configuration information.

Receiving the second signal sent by the terminal based on the first configuration information includes:

receiving the second signal sent by the terminal, based on the first configuration information, to the network device by using the transmission beam indicated by the beam indication information.

That is, prior to receiving the second signal (the second signal is an SRS used for CSI acquisition), the network device needs to indicate a preferred transmission beam of each panel to the terminal.

Accordingly, prior to sending the beam indication information to the terminal, the method further includes:

sending third indication information to the terminal, wherein the third indication information is used to instruct the terminal to send third signals; the third signals are multiple sets of uplink reference signal resources used for beam training, and each set of uplink reference signal resources includes at least one uplink reference signal resource;

receiving the third signal sent by the terminal, according to the third indication information, by using multiple antenna panels of the terminal;

selecting at least one uplink reference signal resource from uplink reference signal resources corresponding to the third signal;

wherein the transmission beam indicated by the beam indication information is: a transmission beam corresponding to at least one uplink reference signal resource selected by the network device.

For example, for each antenna panel, the following procedures may be repeated. The following description is made by taking the panel n as an example.

The network device configures an SRS resource set, and informs UE of the configuration information.

Based on the configuration information received from the network device, the terminal sends (all SRS resources) in the SRS resource set through an antenna panel n. Beamforming is performed on different SRS resources in the same SRS resource set by the same or different analog beams. Optionally, the terminal determines by itself whether to use the same analog beam and/or determines a used analog beam by itself, which may be transparent to the network device. Of course, the present disclosure is also applicable to situations where an analog beam for transmitting SRS is not transparent to the network device.

For each antenna panel, the network device may determine a preferred analog transmission beam, $[BM_{opt,n}]$ is used to represent a preferred beam of an n-th antenna panel, which corresponds to a transmission beam used when sending a preferred SRS selected by the network device. The network device may determine a preferred analog transmission beam based on a certain criterion. This criterion includes, but is not limited to, Signal to Interference plus Noise Ratio (SINR)/Reference Signal Receiving Power (RSRP)/Reference Signal Receiving Quality (RSRQ) measurements on different SRS resources. It is assumed that $[SRS_{opt,n}]$ is used to represent a preferred SRS resource of an n-th antenna panel determined by the network device.

In this procedure, the network device may also determine a preferred receiving beam. Assuming that single-panel transmission is performed on each antenna panel, and a preferred receiving beam may be determined separately, there is a preferred receiving beam for each transmission panel. In this case, different SRS resource sets should be transmitted on non-overlapping time/frequency resources. Optionally, the network device determines a receiving beam for all panels simultaneously. Or, different SRS resource sets (corresponding to different antenna panels) may be transmitted on the same time/frequency resource.

It should be pointed out that, optionally, the network device may select multiple transmission beams for each antenna panel, for example [$SRS_{opt,n,1}$, $SRS_{opt,n,2}$, . . . ] correspond to an optimal transmission beam of the panel n, an inferior optimal transmission beam of the panel n, and so on, respectively.

In summary, in the embodiment of the present disclosure, a first signal including multiple layers is sent based on at least two sets of first indication information sent by the network device, each of the layers of the first signal has corresponding relationship with a set of first indication information, and each set of first indication information corresponds to an antenna panel, so that it is implemented that multi-antenna panel joint transmission of for the multiple layers is performed on multiple antenna panels simultaneously; and each antenna panel corresponds to a set of first indication information, so that the network device selects an independent beamforming beam for each antenna panel (the beamforming beam is indicated by the first signal resource), so as to obtain better beamforming gain and improve performance of uplink transmission.

Figure 7:
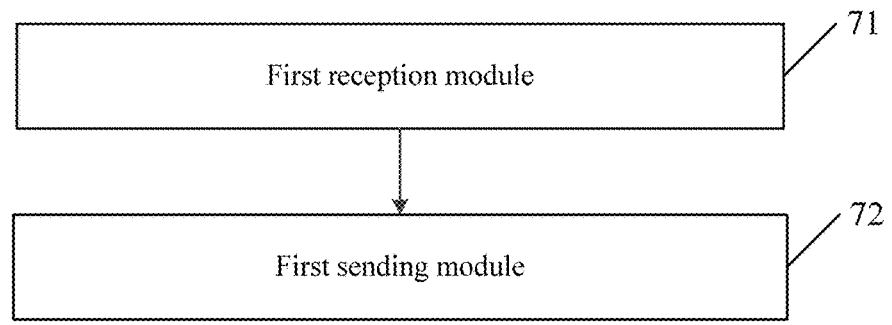
FIG. 7 is a first structural schematic diagram illustrating a signal transmission device provided in an embodiment of the present disclosure.

As shown in FIG. 7, an embodiment of the present disclosure further provides a signal transmission device applied to a terminal, and the device includes a first reception module 71 and a first sending module 72.

The first reception module 71 is used to receive at least two sets of first indication information sent by a network device, wherein each set of first indication information is used to indicate at least one first signal resource.

The first sending module 72 is used to send, according to indication of the at least two sets of first indication information, a first signal; wherein, the first signal includes multiple layers, each of the layers of the first signal has corresponding relationship with one set of first indication information.

Optionally, in the embodiment of the present disclosure, the device further includes a third reception module and a third sending module.

The third reception module is used to receive first configuration information sent by the network device, wherein the first configuration information is used to configure at least one first signal resource for the terminal.

The third sending module is used to send, according to the first configuration information, a second signal to the network device.

The at least one first signal resource indicated by each set of first indication information is: a first signal resource in the at least one first signal resource configured by the first configuration information.

Optionally, in the embodiment of the present disclosure, the first sending module includes the following module.

A first sending submodule is used to send the first signal by using an antenna panel used when sending the second signal corresponding to the at least one first signal resource indicated by each set of first indication information respectively.

Optionally, in the embodiment of the present disclosure, the first sending module includes a first sending submodule.

The first sending submodule is used to send the first signal by using an antenna panel used when sending a second signal corresponding to first signal resources indicated by the at least two of first indication information.

Optionally, in the embodiment of the present disclosure, in a case that only one first signal resource including multiple antenna ports is configured by the first configuration information, the device further includes a fourth reception module.

The fourth reception module is used to receive first grouping information sent by the network device, wherein the first grouping information is used to indicate grouping of the antenna ports of the first signal resource configured by the first configuration information.

Each set of first indication information corresponds to an antenna port group, and each set of first indication information in the at least two sets of first indication information is used to indicate at least one antenna port from a corresponding antenna port group.

Optionally, in the embodiment of the present disclosure, the device further includes a fifth reception module.

The fifth reception module is used to receive second grouping information sent by the network device, wherein the second grouping information is used to indicate grouping of the first signal resources configured by the first configuration information.

Each set of first indication information corresponds to a first signal resource group, and each set of first indication information in the at least two sets of first indication information is used to indicate at least one first signal resource from a corresponding first signal resource group.

Optionally, in the embodiment of the present disclosure, different sets of first indication information are coded independently; or, the at least two sets of first indication information are coded jointly.

Optionally, in the embodiment of the present disclosure, different sets of first indication information are indicated via different physical layer signalings; or, the at least two sets of first indication information are indicated via the same physical layer signaling.

Optionally, in the embodiment of the present disclosure, the first configuration information configures at least one first signal resource subgroup, and each first signal resource subgroup includes at least one first signal resource.

Each set of first indication information corresponds to a first signal resource subgroup.

Optionally, in the embodiment of the present disclosure, the device further includes a sixth reception module and a first determination module.

The sixth reception module is used to receive second indication information for first signal resource subgroups corresponding to the at least two sets of first indication information sent by the network device.

The first determination module is used to determine, according to the second indication information, the first signal resource subgroups corresponding to the at least two sets of first indication information.

Optionally, in the embodiment of the present disclosure, in a case that only one first signal resource subgroup is configured by the first configuration information, and the first signal resource subgroup includes at least one first signal resource, each set of first indication information is used to indicate: at least one first signal resource selected by the network device from the first signal resource subgroup.

In a case that the first configuration information configures multiple first signal resource subgroups for the terminal, and each first signal resource subgroup includes a first signal resource, each set of first indication information is used to indicate: at least one first signal resource subgroup selected by the network device from the multiple first signal resource subgroups.

Optionally, in the embodiment of the present disclosure, each set of first indication information indicates at least one first signal resource by at least one of following:
- indicating a local index of the at least one first signal resource in the first signal resource subgroup where the at least one first signal resource is located;
- indicating a global index of the at least one first signal resource in all first signal resources configured by the network device;
- indicating an absolute index of the at least one first signal resource in all first signal resources configured by the network device;
- indicating a local index of the first signal resource subgroup, where the at least one first signal resource is located, in first signal resource subgroups corresponding to an antenna panel corresponding to the first signal resource subgroup;
- indicating a global index of the first signal resource subgroup, where the at least one first signal resource is located, in all first signal resource subgroups configured by the network device;
- indicating an absolute index of the first signal resource subgroup, where the at least one first signal resource is located, in all first signal resource subgroups configured by the network device.

Optionally, in the embodiment of the present disclosure, the device further includes an acquisition module.

The acquisition module is used to acquire the corresponding relationship between each of the layers of the first signal and each set of first indication information.

Optionally, in the embodiment of the present disclosure, the acquisition module includes a first acquisition submodule and a second acquisition submodule.

The first acquisition submodule is used to receive information about the corresponding relationship between each of the layers of the first signal and each set of first indication information sent by the network device.

The second acquisition submodule is used to acquire, according to the information about the corresponding relationship, the corresponding relationship between each of the layers of the first signal and each set of first indication information.

Optionally, in the embodiment of the present disclosure, the information about the corresponding relationship is indicated by at least one of following:
- indicating, by an information field with a length of K bits, a layer corresponding to each set of first indication information in a bitmap; wherein K is an integer greater than or equal to 2;
- indicating the number of layers corresponding to each set of first indication information;
- indicating a maximum layer identity of a layer corresponding to each set of first indication information.

Optionally, in the embodiment of the present disclosure, the device further includes: a seventh reception module, used to receive beam indication information sent by the network device, wherein the beam indication information is used to indicate a transmission beam corresponding to the first signal resource included in the first configuration information;

The third sending module includes: a second sending submodule, used to send, according to the first configuration information, the second signal to the network device by using the transmission beam indicated by the beam indication information.

Optionally, in the embodiment of the present disclosure, the device further includes an eighth reception module and a fourth sending module.

The eighth reception module is used to receive third indication information sent by the network device, wherein the third indication information is used to instruct the terminal to send third signals; the third signals are multiple sets of uplink reference signal resources used for beam training, and each set of uplink reference signal resources includes at least one uplink reference signal resource.

The fourth sending module is used to respectively send, according to the third indication information, the third signals by using multiple antenna panels of the terminal, respectively.

In summary, in the embodiment of the present disclosure, a first signal including multiple layers is sent based on at least two sets of first indication information sent by the network device, each of the layers of the first signal has corresponding relationship with a set of the first indication information, and each set of the first indication information corresponds to an antenna panel, so that it is achieved that multi-antenna panel joint transmission of the multiple layers is performed on multiple antenna panels simultaneously; and each antenna panel corresponds to a set of first indication information, so that the network device selects an independent beamforming beam for each antenna panel (the beamforming beam is indicated by the first signal resource), so as to obtain better beamforming gain and improve performance of uplink transmission.

It should be noted that, the signal transmission device provided in the embodiment of the present disclosure is a device capable of executing the above-mentioned signal transmission method, and all the embodiments of the above-mentioned signal transmission method are applicable to the device, and may achieve the same or similar beneficial effects.

Figure 8:
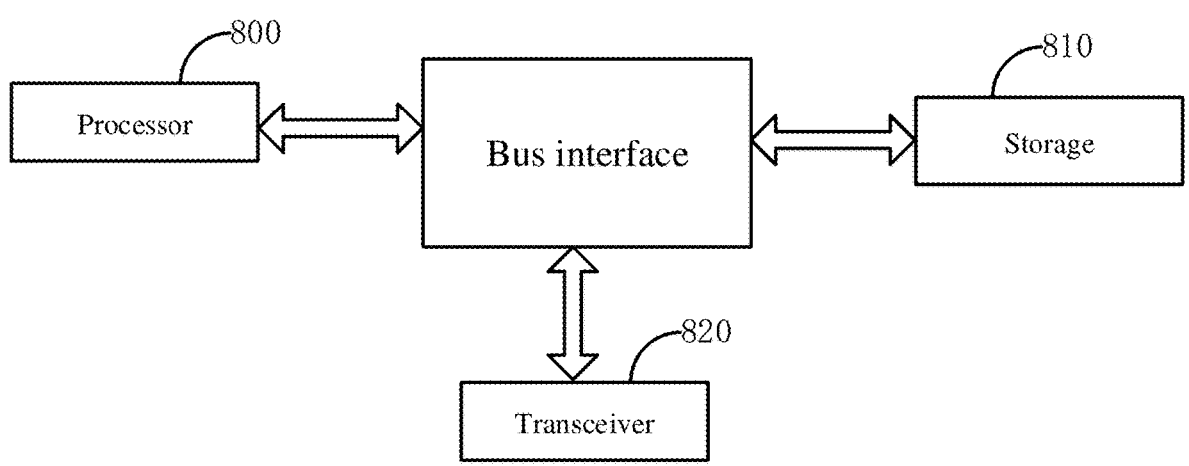
FIG. 8 is a structural schematic diagram illustrating a terminal and a network device provided in an embodiment of the present disclosure.

As shown in FIG. 8, an embodiment of the present disclosure further provides a terminal, and the terminal includes multiple antenna panels, and the terminal further includes: a transceiver 820, a storage 810, a processor 800, and a program stored in the storage 810 and executed by the processor 800; wherein the processor 800 is used to read the program in the storage and control the transceiver 820 to execute the following steps:
- receiving at least two sets of first indication information sent by a network device, wherein each set of first indication information is used to indicate at least one first signal resource;
- sending, according to indication of the at least two sets of first indication information, a first signal; wherein, the first signal includes multiple layers, each of the layers of the first signal has corresponding relationship with one set of first indication information, respectively.

Optionally, in the embodiment of the present disclosure, the transceiver 820 is further used to:
- receive first configuration information sent by the network device, wherein the first configuration information is used to configure at least one first signal resource for the terminal;
- send, according to the first configuration information, a second signal to the network device;

wherein the at least one first signal resource indicated by each set of first indication information is: a first signal resource in the first signal resources configured by the first configuration information.

Optionally, in the embodiment of the present disclosure, the transceiver 820 is further used to:

send the first signal by using an antenna panel used when sending the second signal corresponding to the at least one first signal resource indicated by each set of first indication information respectively.

Optionally, in the embodiment of the present disclosure, the transceiver 820 is further used to: send the first signal by using an antenna panel used when sending the second signal corresponding to first signal resources indicated by the at least two of first indication information.

Optionally, in the embodiment of the present disclosure, in a case that only one first signal resource including multiple antenna ports is configured by the first configuration information, the transceiver 820 is further used to:

receive first grouping information sent by the network device, wherein the first grouping information is used to indicate grouping of the antenna ports of the first signal resource configured by the first configuration information.

Each set of first indication information corresponds to an antenna port group, and each set of first indication information in the at least two sets of first indication information is used to indicate at least one antenna port from a corresponding antenna port group.

Optionally, in the embodiment of the present disclosure, in a case that multiple first signal resources are configured by the first configuration information, the transceiver 820 is further used to:

receiving second grouping information sent by the network device, wherein the second grouping information is used to indicate grouping of the first signal resources configured by the first configuration information.

Each set of first indication information corresponds to a first signal resource group, and each set of first indication information in the at least two sets of first indication information is used to indicate at least one first signal resource from a corresponding first signal resource group.

Optionally, in the embodiment of the present disclosure, different sets of first indication information are coded independently; or, the at least two sets of first indication information are coded jointly.

Optionally, in the embodiment of the present disclosure, different sets of first indication information are indicated via different physical layer signalings; or, the at least two sets of first indication information are indicated via the same physical layer signaling.

Optionally, in the embodiment of the present disclosure, the first configuration information configures at least one first signal resource subgroup, and each first signal resource subgroup includes at least one first signal resource; each set of first indication information corresponds to a first signal resource subgroup.

Optionally, in the embodiment of the present disclosure, the transceiver 820 is further used to:

receive second indication information of first signal resource subgroups corresponding to the at least two sets of first indication information sent by the network device;

determine, according to the second indication information, the first signal resource subgroups corresponding to the at least two sets of first indication information.

Optionally, in the embodiment of the present disclosure, in a case that only one first signal resource subgroup is configured by the first configuration information, and the first signal resource subgroup includes at least one first signal resource, each set of first indication information is used to indicate: at least one first signal resource selected by the network device from the first signal resource subgroup.

In a case that the first configuration information configures multiple first signal resource subgroups for the terminal, and each first signal resource subgroup includes a first signal resource, each set of first indication information is used to indicate: at least one first signal resource subgroup selected by the network device from the multiple first signal resource subgroups.

Optionally, in the embodiment of the present disclosure, each set of first indication information indicates at least one first signal resource by at least one of following:

indicating a local index of the at least one first signal resource in the first signal resource subgroup where the at least one first signal resource is located;

indicating a global index of the at least one first signal resource in all first signal resources configured by the network device;

indicating an absolute index of the at least one first signal resource in all first signal resources configured by the network device;

indicating a local index of the first signal resource subgroup, where the at least one first signal resource is located, in first signal resource subgroups corresponding to an antenna panel corresponding to the first signal resource subgroup;

indicating a global index of the first signal resource subgroup, where the at least one first signal resource is located, in all first signal resource subgroups configured by the network device;

indicating an absolute index of the first signal resource subgroup, where the at least one first signal resource is located, in all first signal resource subgroups configured by the network device.

Optionally, in the embodiment of the present disclosure, the transceiver 820 is further used to:

acquire the corresponding relationship between each of the layers of the first signal and each set of first indication information.

Optionally, in the embodiment of the present disclosure, the transceiver 820 is further used to:

receive information about the corresponding relationship, sent by the network device, between each of the layers of the first signal and each set of first indication information.

The processor 800 is further used to:

acquire, according to the information about the corresponding relationship, the corresponding relationship between each of the layers of the first signal and each set of first indication information.

Optionally, in the embodiment of the present disclosure, the information about the corresponding relationship is indicated by at least one of:

indicating, by an information field with a length of K bits, layers corresponding to each set of first indication information in a bitmap; wherein K is an integer greater than or equal to 2;

indicating the number of layers corresponding to each set of first indication information;

indicating a maximum layer identity of a layer corresponding to each set of first indication information.

Optionally, in the embodiment of the present disclosure, the transceiver 820 is further used to:

receive beam indication information sent by the network device, wherein the beam indication information is used to indicate a transmission beam corresponding to the first signal resource included in the first configuration information;

send, according to the first configuration information, the second signal to the network device by using a transmission beam indicated by the beam indication information.

Optionally, in the embodiment of the present disclosure, the transceiver 820 is further used to:

receive third indication information sent by the network device, wherein the third indication information is used to instruct the terminal to send third signals; the third signals are multiple sets of uplink reference signal resources used for beam training, and each set of uplink reference signal resources includes at least one uplink reference signal resource;

send, according to the third indication information, the third signals by using multiple antenna panels of the terminal, respectively.

In summary, in the embodiment of the present disclosure, a first signal including multiple layers is sent based on at least two sets of first indication information sent by the network device, each of the layers of the first signal has corresponding relationship with a set of the first indication information, and each set of the first indication information corresponds to an antenna panel, so that it is achieved that multi-antenna panel joint transmission of the multiple layers is performed from multiple antenna panels simultaneously; and each antenna panel corresponds to a set of first indication information, so that the network device selects an independent beamforming beam for each antenna panel (the beamforming beam is indicated by the first signal resource), so as to obtain better beamforming gain and improve performance of uplink transmission.

It should be noted that, the terminal provided in the embodiment of the present disclosure is a terminal capable of executing the above-mentioned signal transmission method, and all embodiments of the above-mentioned signal transmission method are applicable to the terminal, and may achieve the same or similar beneficial effects.

An embodiment of the present disclosure further provides a computer readable storage medium, a computer program is stored on the computer readable storage medium, and when the computer program is executed by a processor, various steps in the foregoing embodiment of the signal transmission method applied to a terminal are implemented, and the same technical effect can be achieved, which will not be repeated herein to avoid repetition. The computer readable storage medium may be, for example, a Read-Only Memory (ROM), a Random Access Memory (RAM), a magnetic disk or an optical disk, etc.

Figure 9:
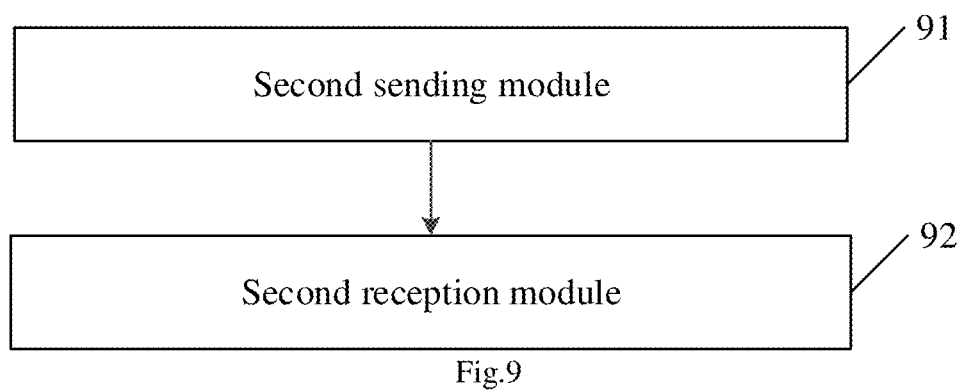
FIG. 9 is a second structural schematic diagram illustrating a signal transmission device provided in an embodiment of the present disclosure.

As shown in FIG. 9, an embodiment of the present disclosure further provides a signal transmission device applied to a network device and includes a second sending module 91 and a second reception module 92.

The second sending module 91 is used to send at least two sets of first indication information to a terminal, wherein each set of first indication information is used to indicate at least one first signal resource.

The second reception module 92 is used to receive a first signal sent by the terminal based on indication of the at least two sets of first indication information; wherein, the first signal includes multiple layers, each of the layers of the first signal has corresponding relationship with one set of first indication information.

Optionally, in the embodiment of the present disclosure, the device further includes a ninth sending module, a fifth reception module, and a first selection module.

The ninth sending module is used to send first configuration information to the terminal, wherein the first configuration information is used to configure at least one first signal resource for the terminal.

The fifth reception module is used to receive a second signal sent by the terminal based on the first configuration information.

The first selection module is used to measure the second signal, select at least one first signal resource from first signal resources corresponding to the second signal.

The at least one first signal resource indicated by each set of first indication information is: the at least one first signal resource selected by the network device.

Optionally, in the embodiment of the present disclosure, the second reception module includes a first reception submodule.

The first reception submodule is used to receive the first signal sent by the terminal by using an antenna panel used when the terminal sends the second signal corresponding to the at least one first signal resource indicated by each set of first indication information, respectively.

Optionally, in the embodiment of the present disclosure, in a case that only one first signal resource including multiple antenna ports is configured by the first configuration information, the device further includes a tenth sending module.

The tenth sending module is used to send first grouping information to the terminal, wherein the first grouping information is used to indicate grouping of the antenna ports of the first signal resource configured by the first configuration information.

Each set of first indication information corresponds to an antenna port group, and each set of first indication information in the at least two sets of first indication information is used to indicate at least one antenna port from a corresponding antenna port group.

Optionally, in the embodiment of the present disclosure, in a case that multiple first signal resources are configured by the first configuration information, the device further includes an eleventh sending module.

The eleventh sending module is used to second grouping information to the terminal, wherein the second grouping information is used to indicate grouping of the first signal resources configured by the first configuration information.

Each set of first indication information corresponds to a first signal resource group, and each set of first indication information in the at least two sets of first indication information is used to indicate at least one first signal resource from a corresponding first signal resource group.

Optionally, in the embodiment of the present disclosure, different sets of first indication information are coded independently; or, the at least two sets of first indication information are coded jointly.

Optionally, in the embodiment of the present disclosure, different sets of first indication information are indicated via different physical layer signalings; or, the at least two sets of first indication information are indicated via the same physical layer signaling.

Optionally, in the embodiment of the present disclosure, the first configuration information configures at least one first signal resource subgroup, and each first signal resource subgroup includes at least one first signal resource.

Each set of first indication information corresponds to a first signal resource subgroup.

Optionally, in the embodiment of the present disclosure, the device further includes a twelfth sending module and a second determination module.

The twelfth sending module is used to send second indication information of first signal resource subgroups corresponding to the at least two sets of first indication information to the terminal.

The second determination module is used to determine, according to the second indication information, the first signal resource subgroups corresponding to the at least two sets of first indication information.

Optionally, in the embodiment of the present disclosure, in a case that only one first signal resource subgroup is configured by the first configuration information, and the first signal resource subgroup includes at least one first signal resource, each set of first indication information is used to indicate: at least one first signal resource selected by the network device from the first signal resource subgroup.

In a case that the first configuration information configures multiple first signal resource subgroups for the terminal, and each first signal resource subgroup includes a first signal resource, each set of first indication information is used to indicate: at least one first signal resource subgroup selected by the network device from the multiple first signal resource subgroups.

Optionally, in the embodiment of the present disclosure, each set of first indication information indicates at least one first signal resource by at least one of following:

indicating a local index of the at least one first signal resource in the first signal resource subgroup where the at least one first signal resource is located;

indicating a global index of the at least one first signal resource in all first signal resources configured by the network device;

indicating an absolute index of the at least one first signal resource in all first signal resources configured by the network device;

indicating a local index of the first signal resource subgroup, where the at least one first signal resource is located, in first signal resource subgroups corresponding to an antenna panel corresponding to the first signal resource subgroup;

indicating a global index of the first signal resource subgroup, where the at least one first signal resource is located, in all first signal resource subgroups configured by the network device;

indicating an absolute index of the first signal resource subgroup, where the at least one first signal resource is located, in all first signal resource subgroups configured by the network device.

Optionally, in the embodiment of the present disclosure, the device further includes a thirteenth sending module.

The thirteenth sending module is used to send to the terminal information about a corresponding relationship between each of the layers of the first signal and each set of first indication information, so that the terminal acquires, according to the information about the corresponding relationship, the corresponding relationship between each of the layers of the first signal and each set of first indication information.

Optionally, in the embodiment of the present disclosure, the information about the corresponding relationship is indicated by at least one of following:

indicating, by an information field with a length of K bits, layers corresponding to each set of first indication information in a bitmap; wherein K is an integer greater than or equal to 2;

indicating the number of layers corresponding to each set of first indication information;

indicating a maximum layer identity of a layer corresponding to each set of first indication information.

Optionally, in the embodiment of the present disclosure, the device further includes: a fourteenth sending module, used to send beam indication information to the terminal, wherein the beam indication information is used to indicate a transmission beam corresponding to the first signal resource included in the first configuration information.

The second reception module includes: a second reception submodule, used to receive the second signal, sent by the terminal based on the first configuration information to the network device by using the transmission beam indicated by the beam indication information.

Optionally, in the embodiment of the present disclosure, the device further includes a fifteenth sending module, a tenth reception, and a second selection module.

The fifteenth sending module is used to send third indication information to the terminal, wherein the third indication information is used to instruct the terminal to send third signals; the third signals are multiple sets of uplink reference signal resources used for beam training, and each set of uplink reference signal resources includes at least one uplink reference signal resource.

The tenth reception module is used to receive the third signals sent by the terminal according to the third indication information by using multiple antenna panels of the terminal.

The second selection module is used to select at least one uplink reference signal resource from uplink reference signal resources corresponding to the third signal.

The transmission beam indicated by the beam indication information is: a transmission beam corresponding to at least one uplink reference signal resource selected by the network device.

In summary, in the embodiment of the present disclosure, a first signal including multiple layers is sent based on at least two sets of first indication information sent by the network device, each of the layers of the first signal has corresponding relationship with a set of first indication information, and each set of first indication information corresponds to an antenna panel, so that it is achieved that multi-antenna panel joint transmission of multiple layers is performed from multiple antenna panels simultaneously; and each antenna panel corresponds to a set of first indication information, so that the network device selects an independent beamforming beam for each antenna panel (the beamforming beam is indicated by the first signal resource), so as to obtain a better beamforming gain and improve performance of uplink transmission.

It should be noted that, the signal transmission device provided in the embodiment of the present disclosure is a device capable of executing the above-mentioned signal transmission method, and all the embodiments of the above-mentioned signal transmission method are applicable to the device, and may achieve the same or similar beneficial effects.

As shown in FIG. 8, an embodiment of the present disclosure further provides a network device, and the network device includes: a transceiver 820, a storage 810, a processor 800, and a computer program stored in the storage 810 and executed by the processor 800; wherein the processor 800 is used to read the program in the storage and control the transceiver 820 to execute the following steps:

sending at least two sets of first indication information to a terminal, wherein each set of first indication information is used to indicate at least one first signal resource;

receiving a first signal sent by the terminal based on indication of the at least two sets of first indication information; wherein, the first signal includes multiple layers, each of the layers of the first signal has corresponding relationship with one set of first indication information.

Optionally, in the embodiment of the present disclosure, the transceiver 820 is further used to:

send first configuration information to the terminal, wherein the first configuration information is used to configure at least one first signal resource for the terminal;

receive a second signal sent by the terminal based on the first configuration information;

measure the second signal, select at least one first signal resource from first signal resources corresponding to the second signal;

wherein the at least one first signal resource indicated by each set of first indication information is at least one first signal resource selected by the network device.

Optionally, in the embodiment of the present disclosure, the transceiver 820 is further used to:

receive the first signal sent by the terminal by using an antenna panel used when the terminal sends the second signal corresponding to the at least one first signal resource indicated by each set of first indication information, respectively.

Optionally, in the embodiment of the present disclosure, in a case that only one first signal resource including multiple antenna ports is configured by the first configuration information, the transceiver 820 is further used to:

send first grouping information to the terminal, wherein the first grouping information is used to indicate grouping of antenna ports of the first signal resource configured by the first configuration information.

Each set of first indication information corresponds to an antenna port group, and each set of first indication information in the at least two sets of first indication information is used to indicate at least one antenna port from a corresponding antenna port group.

Optionally, in the embodiment of the present disclosure, in a case that multiple first signal resources are configured by the first configuration information, the transceiver 820 is further used to:

send second grouping information to the terminal, wherein the second grouping information is used to indicate grouping of first signal resources configured by the first configuration information.

Each set of first indication information corresponds to a first signal resource group, and each set of first indication information in the at least two sets of first indication information is used to indicate at least one first signal resource from a corresponding first signal resource group.

Optionally, in the embodiment of the present disclosure, different sets of first indication information are coded independently; or, the at least two sets of first indication information are coded jointly.

Optionally, in the embodiment of the present disclosure, different sets of first indication information are indicated via different physical layer signalings; or, the at least two sets of first indication information are indicated via the same physical layer signaling.

Optionally, in the embodiment of the present disclosure, the first configuration information configures at least one first signal resource subgroup, and each first signal resource subgroup includes at least one first signal resource;

Each set of first indication information corresponds to a first signal resource subgroup.

Optionally, in the embodiment of the present disclosure, the transceiver 820 is further used to:

send second indication information of first signal resource subgroups corresponding to the at least two sets of first indication information to the terminal;

determine, according to the second indication information, the first signal resource subgroups corresponding to the at least two sets of first indication information.

Optionally, in the embodiment of the present disclosure, in a case that only one first signal resource subgroup is configured by the first configuration information, and the first signal resource subgroup includes at least one first signal resource, each set of first indication information is used to indicate: at least one first signal resource selected by the network device from the first signal resource subgroup.

In a case that the first configuration information configures multiple first signal resource subgroups for the terminal, and each first signal resource subgroup includes a first signal resource, each set of first indication information is used to indicate: at least one first signal resource subgroup selected by the network device from the multiple first signal resource subgroups.

Optionally, in the embodiment of the present disclosure, each set of first indication information indicates at least one first signal resource by at least one of following:

indicating a local index of the at least one first signal resource in the first signal resource subgroup where the at least one first signal resource is located;

indicating a global index of the at least one first signal resource in all first signal resources configured by the network device;

indicating an absolute index of the at least one first signal resource in all first signal resources configured by the network device;

indicating a local index of the first signal resource subgroup, where the at least one first signal resource is located, in first signal resource subgroups corresponding to an antenna panel corresponding to the first signal resource subgroup;

indicating a global index of the first signal resource subgroup, where the at least one first signal resource is located, in all first signal resource subgroups configured by the network device;

indicating an absolute index of the first signal resource subgroup, where the at least one first signal resource is located, in all first signal resource subgroups configured by the network device.

Optionally, in the embodiment of the present disclosure, the transceiver 820 is further used to:

send to the terminal information about a corresponding relationship between each of the layers of the first signal and each set of first indication information, so that the terminal acquires, according to the information about the corresponding relationship, the corresponding relationship between each of the layers of the first signal and each set of first indication information.

Optionally, in the embodiment of the present disclosure, the information about the corresponding relationship is indicated by at least one of following:
  indicating, by an information field with a length of K bits, layers corresponding to each set of first indication information in a bitmap; wherein K is an integer greater than or equal to 2;
  indicating the number of layers corresponding to each set of first indication information;
  indicating a maximum layer identity of a layer corresponding to each set of first indication information.

Optionally, in the embodiment of the present disclosure, the transceiver 820 is further used to:
  send beam indication information to the terminal, wherein the beam indication information is used to indicate a transmission beam corresponding to the first signal resource included in the first configuration information;
  receive the second signal sent by the terminal, based on the first configuration information, to the network device by using the transmission beam indicated by the beam indication information.

Optionally, in the embodiment of the present disclosure, the transceiver 820 is further used to:
  send third indication information to the terminal, wherein the third indication information is used to instruct the terminal to send third signals; the third signals are multiple sets of uplink reference signal resources used for beam training, and each set of uplink reference signal resources includes at least one uplink reference signal resource;
  receive the third signals sent by the terminal, according to the third indication information, by using multiple antenna panels of the terminal, respectively;
The processor 800 is further used to:
  select at least one uplink reference signal resource from uplink reference signal resources corresponding to the third signal;
  wherein the transmission beam indicated by the beam indication information is: a transmission beam corresponding to at least one uplink reference signal resource selected by the network device.

In summary, in the embodiment of the present disclosure, a first signal including multiple layers is sent based on at least two sets of first indication information sent by the network device, each of the layers of the first signal has corresponding relationship with a set of the first indication information, and each set of the first indication information corresponds to an antenna panel, so that it is achieved that multi-antenna panel joint transmission of multiple layers is performed from multiple antenna panels simultaneously; and each antenna panel corresponds to a set of first indication information, so that the network device selects an independent beamforming beam for each antenna panel (the beamforming beam is indicated by the first signal resource), so as to obtain a better beamforming gain and improve performance of uplink transmission.

It should be noted that, the network device provided in the embodiment of the present disclosure is a network device capable of performing the above-mentioned signal transmission method, and all the embodiments of the above-mentioned signal transmission method are applicable to the network device, and may achieve the same or similar beneficial effects.

An embodiment of the present disclosure further provides a computer readable storage medium, a computer program is stored on the computer readable storage medium, and when the computer program is executed by a processor, various steps in the foregoing embodiment of the signal transmission method performed by a network device are implemented, and the same technical effect can be achieved, which will not be repeated herein to avoid repetition. The computer readable storage medium may be, for example, a Read-Only Memory (ROM), a Random Access Memory (RAM), a magnetic disk or an optical disk, etc.

It should be noted that, in various embodiments of the present disclosure, the implementation in which each set of first indication information corresponds to one antenna panel may be expanded to a case where each set of first indication information corresponds to an antenna panel group. The antenna panel group may include one or more antenna panels.

It should be noted that, in this article, the terms "including" or "having" or any other variations thereof are intended to encompass a non-exclusive inclusion, such that a process, a method, an article, or a device that includes a plurality of elements includes not only those elements but also other elements not explicitly listed, or elements that are inherent to such a process, a method, an article, or a device. An element after a phrase "comprising a . . . " does not exclude presence of additional identical elements in the process, the method, the article, or the device that comprises the element, if without further limitation.

Through description of the foregoing embodiments, it is clear to those skilled in the art that the foregoing method embodiments may be implemented by software plus a necessary general hardware platform, and certainly may also be implemented by hardware, but in many cases, the former is a better implementation. Based upon such understanding, the technical solutions of the present disclosure essentially or a part thereof contributing to the related art may be embodied in the form of a computer software product which may be stored in a storage medium (e.g., a ROM/RAM, a magnetic disk or an optical disk) and which includes several instructions to cause a terminal (which may be a mobile phone, a computer, a server, an air-conditioner or a network device, etc.) to perform the methods described in the various embodiment of the present disclosure. Hardware may include, but is not limited to, electronic circuits, Application Specific Integrated Circuits (ASIC), programmable logic devices, programmable processors, etc.

The embodiments of the present disclosure are described above with reference to the accompanying drawings, but the present disclosure is not limited to the above-mentioned specific embodiments, and the above-mentioned specific embodiments are only illustrative and not restrictive. A person of ordinary skill in the art with hints of the present disclosure may also make many forms that fall within the protection scope of the present disclosure without departing from the spirit and the protection scope of the claims of the present disclosure.

The descriptions above are optional embodiments of the disclosure, it should be noted, those skilled in the art may make various improvements and embellishments without departing from principles described in the present disclosure, and the various improvements and the embellishments shall be within the protection scope of the present disclosure.

What is claimed is:

1. A signal transmission method, performed by a terminal, comprising:
  receiving at least two sets of first indication information sent by a network device, wherein each set of first indication information is used to indicate at least one first signal resource;

sending a first signal according to indication of the at least two sets of first indication information, wherein, the first signal comprises multiple layers, each of the layers of the first signal has corresponding relationship with one of the at least two sets of first indication information, wherein, prior to receiving the at least two sets of first indication information sent by the network device, the method further comprises:

receiving first configuration information sent by the network device, wherein the first configuration information is configured to configure at least one first signal resource for the terminal;

sending a second signal to the network device according to the first configuration information, wherein the at least one first signal resource indicated by each set of first indication information is a first signal resource in the at least one first signal resource configured by the first configuration information, wherein in a case that only one first signal resource comprising multiple antenna ports is configured by the first configuration information, prior to sending the first signal according to the indication of the at least two sets of first indication information, the method further comprises:

receiving first grouping information sent by the network device, wherein the first grouping information is configured to indicate grouping of antenna ports of the at least one first signal resource configured by the first configuration information;

wherein, each set of first indication information corresponds to an antenna port group, and each set of first indication information in the at least two sets of first indication information is configured to indicate at least one antenna port from a corresponding antenna port group;

or, in a case that multiple first signal resources are configured by the first configuration information, prior to sending the first signal according to the indication of the at least two sets of first indication information, the method further comprises:

receiving second grouping information sent by the network device, wherein the second grouping information is configured to indicate grouping of the first signal resources configured by the first configuration information;

wherein, each set of first indication information corresponds to a first signal resource group, and each set of first indication information in the at least two sets of first indication information is configured to indicate at least one first signal resource from a corresponding first signal resource group.

2. The method according to claim 1, wherein sending the first signal according to the indication of the at least two sets of first indication information comprises:

sending the first signal by using an antenna panel used when sending a second signal corresponding to the at least one first signal resource indicated by each set of first indication information.

3. The method according to claim 1, wherein the first configuration information configures at least one first signal resource subgroup, and each of the at least one first signal resource subgroup comprises at least one first signal resource;

wherein, each set of first indication information corresponds to a first signal resource subgroup.

4. The method according to claim 3, further comprising:

receiving second indication information of first signal resource subgroups corresponding to the at least two sets of first indication information sent by the network device;

determining, according to the second indication information, first signal resource subgroups corresponding to the at least two sets of first indication information.

5. The method according to claim 3, wherein, in a case that only one first signal resource subgroup is configured by the first configuration information and the first signal resource subgroup comprises at least one first signal resource, each set of first indication information is configured to indicate at least one first signal resource selected by the network device from the first signal resource subgroup;

in a case that the first configuration information configures multiple first signal resource subgroups for the terminal and each first signal resource subgroup comprises a first signal resource, each set of first indication information is used to indicate at least one first signal resource subgroup selected by the network device from the multiple first signal resource subgroups.

6. The method according to claim 1, wherein prior to sending the first signal according to the indication of the at least two sets of first indication information, the method further comprises:

acquiring the corresponding relationship between each of the layers of the first signal and each set of first indication information.

7. The method according to claim 1, wherein prior to sending the second signal to the network device according to the first configuration information, the method further comprises:

receiving beam indication information sent by the network device, wherein the beam indication information is configured to indicate a transmission beam corresponding to the first signal resource comprised in the first configuration information;

sending the second signal to the network device according to the first configuration information comprises:

sending, according to the first configuration information, the second signal to the network device by using the transmission beam indicated by the beam indication information.

8. A signal transmission method, performed by a network device, comprising:

sending at least two sets of first indication information to a terminal, wherein each set of first indication information is used to indicate at least one first signal resource;

receiving a first signal sent by the terminal based on indication of the at least two sets of first indication information; wherein, the first signal comprises multiple layers, each of the layers of the first signal has corresponding relationship with one set of first indication information, wherein, prior to sending the at least two sets of first indication information to the terminal, the method further comprises:

sending first configuration information to the terminal, wherein the first configuration information is used to configure at least one first signal resource for the terminal;

receiving a second signal sent based on the first configuration information by the terminal;

measuring the second signal, selecting at least one first signal resource from first signal resources corresponding to the second signal;

wherein the at least one first signal resource indicated by each set of first indication information is at least one first signal resource selected by the network device, wherein in a case that only one first signal resource comprising multiple antenna ports is configured by the first configuration information, prior to receiving the second signal sent based on the first configuration information by the terminal, the method further comprises:

sending first grouping information to the terminal, wherein the first grouping information is configured to indicate grouping of antenna ports of the first signal resource configured by the first configuration information;

wherein, each set of first indication information corresponds to an antenna port group, and each set of first indication information in the at least two sets of first indication information is configured to indicate at least one antenna port from a corresponding antenna port group;

or, in a case that multiple first signal resources are configured by the first configuration information, prior to receiving the second signal sent based on the first configuration information by the terminal, the method further comprises:

sending second grouping information to the terminal, wherein the second grouping information is configured to indicate grouping of the first signal resources configured by the first configuration information;

wherein, each set of first indication information corresponds to a first signal resource group, and each set of first indication information in the at least two sets of first indication information is configured to indicate at least one first signal resource from a corresponding first signal resource group.

9. The method according to claim 8, wherein receiving the first signal sent by the terminal based on the indication of the at least two sets of first indication information comprises:
receiving the first signal sent by the terminal by using an antenna panel used when the terminal sends the second signal corresponding to the at least one first signal resource indicated by each set of first indication information, respectively.

10. The method according to claim 8, wherein the first configuration information configures at least one first signal resource subgroup, and each first signal resource subgroup comprises at least one first signal resource;
each set of first indication information corresponds to a first signal resource subgroup.

11. The method according to claim 10, further comprising:
sending second indication information of first signal resource subgroups corresponding to the at least two sets of first indication information to the terminal;
determining, according to the second indication information, the first signal resource subgroups corresponding to the at least two sets of first indication information.

12. The method according to claim 10, wherein,
in a case that only one first signal resource subgroup is configured by the first configuration information and the first signal resource subgroup comprises at least one first signal resource, each set of first indication information is configured to indicate at least one first signal resource selected by the network device from the first signal resource subgroup;
in a case that the first configuration information configures multiple first signal resource subgroups for the terminal and each first signal resource subgroup comprises a first signal resource, each set of first indication information is configured to indicate at least one first signal resource subgroup selected by the network device from the multiple first signal resource subgroups.

13. The method according to claim 8, wherein prior to receiving the second signal sent based on the first configuration information by the terminal, the method further comprises:
sending beam indication information to the terminal, wherein the beam indication information is configured to indicate a transmission beam corresponding to the first signal resource comprised in the first configuration information;
receiving the second signal sent based on the first configuration information by the terminal comprises:
receiving the second signal sent by the terminal, based on the first configuration information, to the network device by using the transmission beam indicated by the beam indication information.

14. The method according to claim 13, wherein, prior to sending the beam indication information to the terminal, the method further comprises:
sending third indication information to the terminal, wherein the third indication information is configured to instruct the terminal to send third signals; the third signals are multiple sets of uplink reference signal resources used for beam training, and each set of uplink reference signal resources comprises at least one uplink reference signal resource;
receiving the third signals sent by the terminal according to the third indication information by using multiple antenna panels of the terminal;
selecting at least one uplink reference signal resource from the uplink reference signal resources corresponding to the third signal;
wherein the transmission beam indicated by the beam indication information is a transmission beam corresponding to at least one uplink reference signal resource selected by the network device.

15. A network device, comprising:
a transceiver, a storage, a processor and a computer program stored on the storage and executable by the processor, wherein, the processor is configured to read the program on the storage and control the transceiver to execute steps of the signal transmission method according to claim 8.

16. A terminal, comprising:
multiple antenna panels, wherein the terminal further comprises: a transceiver, a storage, a processor, and a program stored in the storage and executable by the processor; wherein the processor is configured to read the program in the storage and control the transceiver to execute the following steps:
receiving at least two sets of first indication information sent by a network device, wherein each set of first indication information is configured to indicate at least one first signal resource;
sending a first signal according to indication of the at least two sets of first indication information, wherein, the first signal comprises multiple layers, each of the layers of the first signal has corresponding relationship with one set of first indication information, wherein, the processor is configured to read the program in the storage and control the transceiver to further execute the following steps, prior to receiving the at least two sets of first indication information sent by the network device, receiving first configuration information sent by the network device, wherein the first configuration information is configured to configure at least one first signal resource for the terminal;

sending a second signal to the network device according to the first configuration information, wherein the at least one first signal resource indicated by each set of first indication information is a first signal resource in the at least one first signal resource configured by the first configuration information, wherein in a case that only one first signal resource comprising multiple antenna ports is configured by the first configuration information, the processor is configured to read the program in the storage and control the transceiver to further execute the following steps, prior to sending the first signal according to the indication of the at least two sets of first indication information, receiving first grouping information sent by the network device, wherein the first grouping information is configured to indicate grouping of antenna ports of the at least one first signal resource configured by the first configuration information;

wherein, each set of first indication information corresponds to an antenna port group, and each set of first indication information in the at least two sets of first indication information is configured to indicate at least one antenna port from a corresponding antenna port group;

or, in a case that multiple first signal resources are configured by the first configuration information, the processor is configured to read the program in the storage and control the transceiver to further execute the following steps, prior to sending the first signal according to the indication of the at least two sets of first indication information, receiving second grouping information sent by the network device, wherein the second grouping information is configured to indicate grouping of the first signal resources configured by the first configuration information;

wherein, each set of first indication information corresponds to a first signal resource group, and each set of first indication information in the at least two sets of first indication information is configured to indicate at least one first signal resource from a corresponding first signal resource group.

* * * * *